US008393953B2

(12) United States Patent
Nishimura et al.

(10) Patent No.: US 8,393,953 B2
(45) Date of Patent: Mar. 12, 2013

(54) GAMING MACHINE FOR SELECTING BONUS REEL

(75) Inventors: Hiroyuki Nishimura, Tokyo (JP); Yoichi Kato, Tokyo (JP); Hiroki Saito, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 968 days.

(21) Appl. No.: 12/249,482

(22) Filed: Oct. 10, 2008

(65) Prior Publication Data

US 2009/0104970 A1 Apr. 23, 2009

(30) Foreign Application Priority Data

Oct. 12, 2007 (JP) ................................ 2007-266445

(51) Int. Cl.
*A63F 9/24* (2006.01)
*A63F 13/00* (2006.01)

(52) U.S. Cl. ................ 463/21; 463/16; 463/17; 463/18; 463/19; 463/20; 463/22

(58) Field of Classification Search ............... 463/16–22
See application file for complete search history.

(56) References Cited

U.S. PATENT DOCUMENTS 6,517,433 B2 2/2003 Loose et al.
2004/0166918 A1* 8/2004 Walker et al. .................. 463/16
2004/0198485 A1* 10/2004 Loose et al. .................... 463/20
2005/0059459 A1* 3/2005 Dunn et al. ...................... 463/16
2005/0239539 A1* 10/2005 Inamura .......................... 463/20

FOREIGN PATENT DOCUMENTS

JP 2002-320713 11/2002
JP 2004-215853 8/2004
JP 2004-321245 11/2004
JP 2006-181225 7/2006

OTHER PUBLICATIONS

Japanese Patent Office, Office Action of JP2007-266445, Jun. 5, 2012.

* cited by examiner

*Primary Examiner* — Arthur O. Hall
*Assistant Examiner* — Jasson Yoo
(74) *Attorney, Agent, or Firm* — Lexyoume IP Meister, PLLC.

(57) ABSTRACT

Before the start of a free game, a slot machine displays a selection screen on a variable display portion and accepts a selection made by the player with respect to the first choice image and the second choice image. The first special reel band or the second special reel band including a larger number of condor symbols than the normal reel band is associated by lottery to the first choice image and the second choice image. The main CPU changes the normal reel band associated to each reel display portion to a special reel band based on the selection made by the player. Then, the main CPU executes a free game using the special reel band that was changed.

6 Claims, 19 Drawing Sheets

FIG. 11

| | of a Kind | | | | | | | | | | | | |
|---|---|---|---|---|---|---|---|---|---|---|---|---|---|
| | 3 | 4 | 5 | 6 | 7 | 8 | 9 | 10 | 11 | 12 | 13 | 14 | 15 |
| CONDOR | 100 | 200 | 300 | 500 | 500 | 500 | 600 | 600 | 600 | 700 | 700 | 700 | 800 |
| FEATHER | 80 | 150 | 250 | 400 | 400 | 400 | 500 | 500 | 500 | 600 | 600 | 600 | 700 |
| BELL | 70 | 120 | 200 | 300 | 300 | 300 | 400 | 400 | 400 | 500 | 500 | 500 | 600 |
| EGG | - | 20 | 40 | 80 | 180 | 220 | 300 | 360 | - | - | - | - | - |
| WATER MELON | - | 15 | 30 | 60 | 120 | 180 | 260 | 300 | - | - | - | - | - |
| GRAPE | - | 12 | 25 | 50 | 100 | 150 | 200 | 250 | - | - | - | - | - |
| PLUM | - | 10 | 20 | 40 | 90 | 110 | 150 | 180 | - | - | - | - | - |
| ORANGE | - | 8 | 15 | 30 | 60 | 90 | 130 | 150 | - | - | - | - | - |
| LEMON | - | 5 | 10 | 20 | 40 | 60 | 80 | 100 | - | - | - | - | - |
| A | - | 15 | 150 | - | - | - | - | - | - | - | - | - | - |
| K | - | 12 | 120 | - | - | - | - | - | - | - | - | - | - |
| Q | - | 10 | 100 | - | - | - | - | - | - | - | - | - | - |
| J | - | 8 | 80 | - | - | - | - | - | - | - | - | - | - |
| 10 | - | 5 | 50 | - | - | - | - | - | - | - | - | - | - |

FIG. 14

| NORMAL REEL BAND | |
|---|---|
| CODE NUMBER | SYMBOL |
| 00 | BELL |
| 01 | GRAPE |
| 02 | CONDOR |
| 03 | FEATURE |
| 04 | EGG |
| 05 | EGG |
| 06 | LEMON |
| 07 | EGG |
| 08 | EGG |
| 09 | BONUS-A |
| 10 | FEATHER |
| 11 | J |
| 12 | K |
| 13 | A |
| 14 | CONDOR |
| 15 | BONUS-K |
| 16 | EGG |
| 17 | EGG |
| 18 | PLUM |
| 19 | ORENGE |
| 20 | FEATHER |
| ⋮ | ⋮ |

FIG. 15

| RANDOM NUMBER VALUE | CODE NUMBER |
|---|---|
| 0~127 | 00 |
| 128~255 | 01 |
| 256~383 | 02 |
| 384~511 | 03 |
| 512~760 | 04 |
| 761~767 | 05 |
| 768~895 | 06 |
| 896~1023 | 07 |
| 1024~1151 | 08 |
| 1152~1279 | 09 |
| 1280~1307 | 10 |
| 1308~1335 | 11 |
| 1336~1364 | 12 |
| 1365~1491 | 13 |
| 1492~1919 | 14 |
| 1920~2047 | 15 |
| 2048~2175 | 16 |
| 2176~2303 | 17 |
| 2304~2431 | 18 |
| 2432~2559 | 19 |
| 2560~2687 | 20 |
| ⋮ | ⋮ |

| RANDOM NUMBER VALUE | FIRST CHOICE | SECOND CHOICE |
|---|---|---|
| 0～255 | FIRST SPECIAL REEL BAND | SECOND SPECIAL REEL BAND |
| 256～511 | SECOND SPECIAL REEL BAND | FIRST SPECIAL REEL BAND |

FIG. 22A

| FIRST SPECIAL REEL BAND | |
|---|---|
| CODE NUMBER | SYMBOL |
| 00 | BELL |
| 01 | GRAPE |
| 02 | CONDOR |
| 03 | FEATURE |
| 04 | EGG |
| 05 | CONDOR |
| 06 | LEMON |
| 07 | EGG |
| 08 | CONDOR |
| 09 | BONUS-A |
| 10 | FEATHER |
| 11 | J |
| 12 | K |
| 13 | A |
| 14 | CONDOR |
| 15 | BONUS-K |
| 16 | EGG |
| 17 | CONDOR |
| 18 | PLUM |
| 19 | ORENGE |
| 20 | FEATHER |
| ⋮ | ⋮ |

FIG. 22B

| SECOND SPECIAL REEL BAND | |
|---|---|
| CODE NUMBER | SYMBOL |
| 00 | BELL |
| 01 | GRAPE |
| 02 | CONDOR |
| 03 | FEATURE |
| 04 | EGG |
| 05 | CONDOR |
| 06 | LEMON |
| 07 | CONDOR |
| 08 | CONDOR |
| 09 | BONUS-A |
| 10 | FEATHER |
| 11 | J |
| 12 | K |
| 13 | A |
| 14 | CONDOR |
| 15 | BONUS-K |
| 16 | CONDOR |
| 17 | CONDOR |
| 18 | PLUM |
| 19 | ORENGE |
| 20 | FEATHER |
| ⋮ | ⋮ |

GAMING MACHINE FOR SELECTING BONUS REEL

CROSS-REFERENCE TO RELATED APPLICATIONS

This application is based upon and claims a priority from the prior Japanese Patent Application No. 2007-266445 filed on Oct. 12, 2007, the entire contents of which are incorporated herein by reference.

BACKGROUND

1. Field

The preset invention relates to a gaming machine that displays symbols in a variable fashion and stopped fashion based on a symbol row. More particularly, it relates to a gaming machine that displays symbols in a variable fashion and stopped fashion based on a symbol row, even in a special game which is awarded as a result of a normal game.

2. Description of Related Art

Conventionally, there are known gaming machines that display symbols in a variable fashion and stopped fashion based on a symbol row including a plurality of symbols arranged in an array (for instance, including mechanical reels or video reels). In these gaming machines, a special game is awarded if predetermined conditions are satisfied (for instance, the gaming machine disclosed in the specification of U.S. Pat. No. 6,517,433).

In these gaming machines, various types of special games are adopted. For instance, the gaming machine disclosed in the specification of the U.S. Pat. No. 6,517,433 executes a game wherein a payout is directly obtained by selecting a choice image displayed on a display, or a so-called free game, as a special game.

In such a free game which is awarded as a special game, symbols are displayed in a variable fashion and stopped fashion based on a symbol row. A player can thus obtain a payout without using any gaming values. However, in executing a free game, the above-described gaming machine displays symbols in a variable fashion and stopped fashion, using the same symbol row all the time.

Specifically, as the free game progresses, symbols are always displayed in a variable fashion and stopped fashion based on the same symbol row. Accordingly, the free game in such a gaming machine may become monotonous.

The present invention has been worked out in view of the above-described problems and relates to a gaming machine which displays symbols in a variable display and stopped display based on a symbol row, even in a special game. An object of the present invention is to provide a gaming machine which can offer novel amusement to the player, while preventing the special game from becoming monotonous.

SUMMARY

Therefore, in order to achieve the object, according to a first aspect of the present invention, there is provided a gaming machine having: a display onto which symbols are displayed in a variable fashion and stopped fashion, based on a normal symbol row including a plurality of types of symbols arranged therein; and a processor that executes processes as follows: (a) a process of executing a normal game wherein symbols are displayed in a variable fashion and stopped fashion on the display, based on the normal symbol row; (b) a process of associating either of a first symbol row and a second symbol row, by lottery, to a plurality of choice images displayed on the display, with the first symbol row including a larger number of a specific kind of symbols than the normal symbol row, and the second symbol row including a larger number of a specific kind of symbols than the first symbol row; (c) a process of displaying the plurality of choice images on the display and accepting selection of the choice images in all normal symbol rows used for displaying symbols in a variable fashion and stopped fashion, if a game result of the normal game satisfies a predetermined condition; and (d) a process of executing a special game wherein symbols are displayed on the display in a variable fashion and stopped fashion based on a first symbol row or a second symbol row associated to the selected choice images, and a prize is awarded based on the symbols which are displayed in a stopped fashion.

According to this gaming machine, a special game is executed if a game result of a normal game satisfies predetermined conditions. Upon executing the special game, the gaming machine changes a symbol row used for variable and stopped display of symbols into either a first symbol row or a second symbol row, based on a selection result of a choice image. As a result, symbol rows which are used in the special game executed in the gaming machine can be diversified. Herewith, the gaming machine can offer novel amusement to the player. Also, the player is allowed to select a choice image. Accordingly, the gaming machine offers amusement to the player, specifically, involvement with respect to the conditions of the special game. Also, either of the first symbol row and the second symbol row is associated to choice images through lottery. As a result, the player can no longer grasp the selection result of the choice image. Thus, the player can enjoy amusement such as "surprise at the selection result of the choice image".

Further, the number of a specific kind of symbols increases in order from a normal symbol row, a first symbol row and a second symbol row. Thus, according to this gaming machine, the player can easily obtain in a special game a payout in accordance with the specific kind of symbols. As a result, the gaming machine can offer to the player amusement such as a sense of expectancy with respect to award of a payout in the special game. The number of the specific kind of symbols differs in the first symbol row and the second symbol row. Accordingly, the sense of expectancy with respect to award of a payout differs in accordance with the special kind of symbols. As a result, the gaming machine can thus increase amusement with respect to selection of the choice image.

According to one or more aspects of the present invention, there is provided a gaming machine having: a display onto which symbols are displayed in a variable fashion and stopped fashion, based on a normal symbol row wherein a plurality of types of symbols, including a special symbol to which a high payout amount is associated, are arranged; and a processor that executes processes as follows: (a) a process of executing a normal game wherein symbols are displayed on the display in a variable fashion and stopped fashion, based on the normal symbol row; (b) a process of associating either of a first symbol row and a second symbol row, by lottery, to a plurality of choice images displayed on the display, with the first symbol row including a larger number of special symbols than the normal symbol row, and the second symbol row including a larger number of special symbols than the first symbol row; (c) a process of displaying the plurality of choice images on the display and accepting selection of the choice images in all normal symbol rows used for displaying symbols in a variable fashion and stopped fashion, if a game result of the normal game satisfies a predetermined condition; and (d) a process of executing a special game wherein symbols are displayed on the display in a variable fashion and stopped fashion based on a first symbol row or a second symbol row associated to the selected choice images, and a prize is awarded based on the symbols which are displayed in a stopped fashion.

As is the case with the above-described gaming machine, this gaming machine can diversify the symbol rows used in the special game. The gaming machine can thus offer novel amusement to the player. This gaming machine enables selection of choice images, making it possible to offer amusement to the player, such as involvement with respect to the conditions of the special game. These choice images are associated to either of a first symbol row or a second symbol row, through lottery. Accordingly, the player can enjoy amusement such as "surprise at the selection result of the choice images".

The number of special symbols to which a high payout is associated increases in order from the normal symbol row, the first symbol row and the second symbol row. Accordingly, the gaming machine can offer to the player, in the special game, amusement such as the possibility of being awarded a larger payout. The number of special symbols differs in the first symbol row and the second symbol row. Accordingly, the gaming machine can increase amusement with respect to selection of choice images.

According to one or more aspects of the present invention, there is provided a gaming machine having: a display onto which symbols are displayed in a variable fashion and stopped fashion, based on a normal symbol row wherein a plurality of types of symbols, including a first symbol, a second symbol and a special symbol to which a high payout amount is associated, are arranged; and a processor that executes processes as follows: (a) a process of executing a normal game wherein symbols are displayed on the display in a variable fashion and stopped fashion, based on the normal symbol row and a prize is awarded based on the symbols which are displayed in a stopped fashion; (b) a process of generating a first symbol row by substituting the special symbol for the first symbol included in the normal symbol row, and generating a second symbol row by substituting the special symbol for the first symbol and the second symbol included in the normal symbol row; (c) a process of associating either of a first symbol row and a second symbol row, by lottery, to a plurality of choice images displayed on the display; (d) a process of displaying the plurality of choice images on the display and accepting selection of the choice images in all normal symbol rows used for displaying symbols in a variable fashion and stopped fashion, if a game result of the normal game satisfies a predetermined condition; and (e) a process of executing a special game wherein symbols are displayed on the display in a variable fashion and stopped fashion based on a first symbol row or a second symbol row associated to the selected choice images, and a prize is awarded based on the symbols which are displayed in a stopped fashion.

As is the case with the above-described gaming machine, this gaming machine can diversify the symbol rows used in the special game. The gaming machine can thus offer novel amusement to the player. This gaming machine enables selection of the choice images, making it possible to offer amusement to the player, such as involvement with respect to the conditions of the special game. These choice images are associated to either of a first symbol row and a second symbol row, through lottery. Accordingly, the player can enjoy amusement such as "surprise at the selection result of the choice images".

The first symbol row and the second symbol row are generated by substituting special symbols for predetermined symbols (first symbol, second symbol) based on a normal symbol row. In this gaming machine, data concerning the first symbol row and the second symbol row does not have to be stored in a storage device, etc. in advance. Accordingly, in such a gaming machine, the storage capacity in the storage device can be saved. Further, the number of special symbols to which a high payout is associated increases in order from the normal symbol row, the first symbol row and the second symbol row. Accordingly, the gaming machine can offer to the player amusement such as a sense of expectancy with respect to award of a high payout in the special game. The number of special symbols differs in the first symbol row and the second symbol row. Accordingly, the gaming machine can increase the amusement with respect to selection of choice images.

Further, selection of choice images is carried out with respect to all normal symbol rows which are used for displaying symbols in a variable fashion and stopped fashion. As a result, the gaming machine can further increase amusement with respect to changing the symbol rows based on selecting choice images.

BRIEF DESCRIPTION OF THE DRAWINGS

FIG. 11 is an explanatory diagram showing a payout table of the slot machine according to the present embodiment;

FIG. 14 is an explanatory diagram showing a table including associations between code numbers and symbols in a normal reel band;

FIG. 15 is an explanatory diagram showing a table including associations between random numbers and code numbers;

FIG. 22A is an explanatory diagram showing a table including associations between code numbers and symbols in the first special reel band; and FIG. 22B is an explanatory diagram showing a table including associations between code numbers and symbols in the second special reel band.

DETAILED DESCRIPTION

Figure 1:
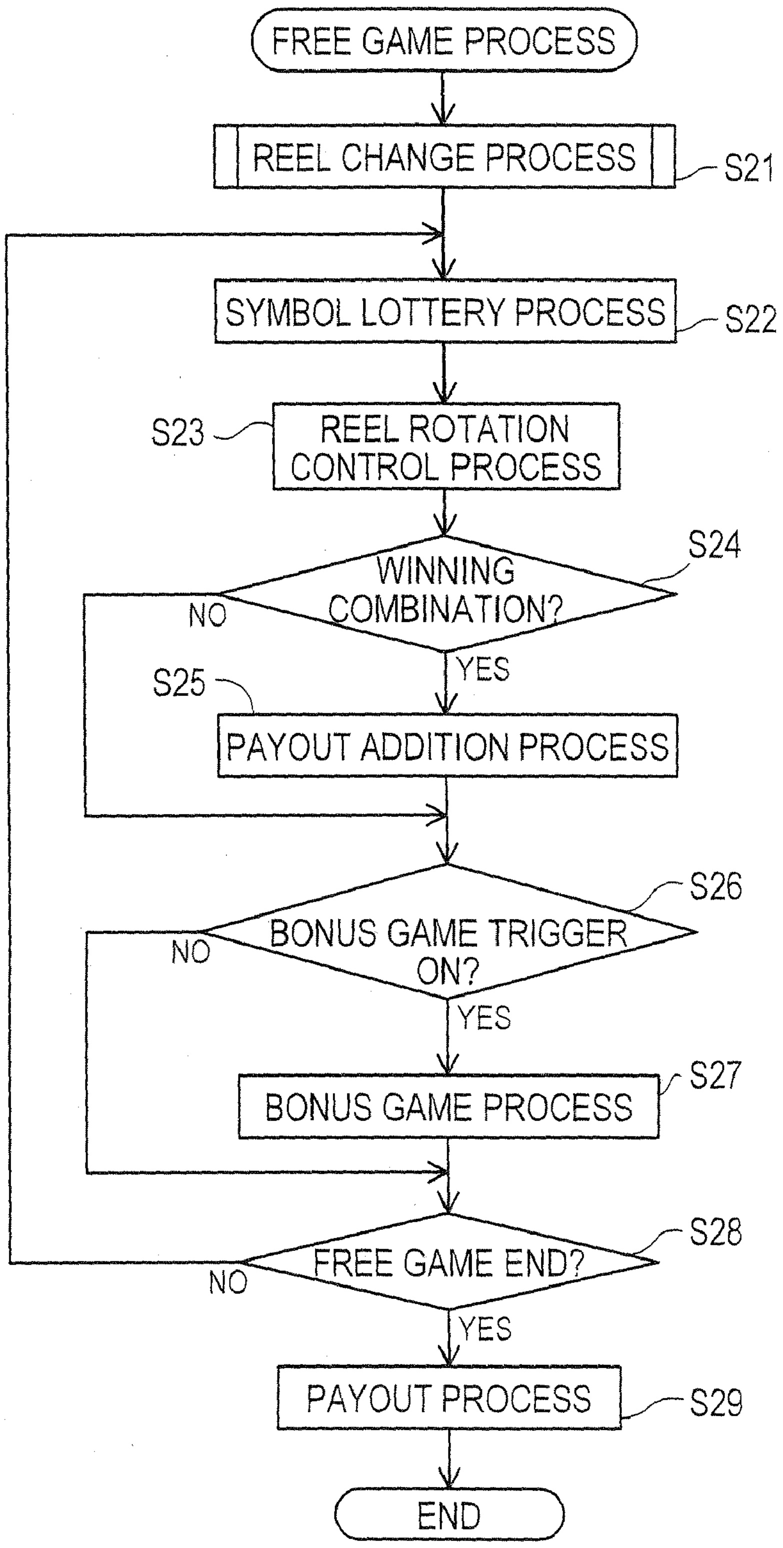
FIG. 1 is a flow chart of a free game process program according to the present embodiment.

Next, a detailed description will be given with respect to embodiments relating to a gaming machine according to the present invention as applied to a slot machine 1, while referring to the accompanying drawings.

A slot machine according to the present embodiment has an image display device such as a liquid crystal display or the like. The slot machine advances a game by displaying images of various types of symbols on the image display device. In other words, the slot machine is a so-called video slot machine.

The slot machine 1 according to the present embodiment displays symbols in a variable fashion and stopped fashion by using the normal reel bands 50 (refer to FIG. 8), on a first reel display portion 101 through a fifth reel display portion 105. The slot machine 1 awards a prize in accordance with the number of the same kind of symbols which are displayed in a stopped fashion on a variable display portion 3B. Here, if a predetermined number or more (in the present embodiment, three symbols) feature symbols 45A are displayed on the variable display portion 3B in a stopped fashion, the slot machine 1 awards a so-called free game as a feature game.

The slot machine 1 displays a selection screen (refer to FIG. 19) on the variable display portion 3B, prior to the start of the free game. The slot machine 1 accepts selection of a first choice image 91 and a second choice image 92 displayed on a selection screen in the respective reel display portions. The first choice image 91 and the second choice image 92 are associated to either of a first special reel band 50A and a second special reel band 50B.

Based on the selection of the first choice image 91 or the second choice image 92 as made by the player, the slot machine 1 changes a reel band used for displaying symbols on the respective display portions in a variable fashion and stopped fashion, from a normal reel band 50 to a first special reel band 50A or a second special reel band 50B. The first special reel band 50A or the second special reel band 50B is made up by substituting a condor symbol 45B corresponding to a high payout for a predetermined egg symbol 45E included in the normal reel band 50. Accordingly, in the free game, the slot machine 1 displays symbols in a variable fashion and stopped fashion based on the first special reel band 50A or the second special reel band 50B associated to the respective reel display portions. As a result, the slot machine 1 can raise the sense of expectancy with respect to award of a high payout, offering more amusement to the player.

Figure 2:
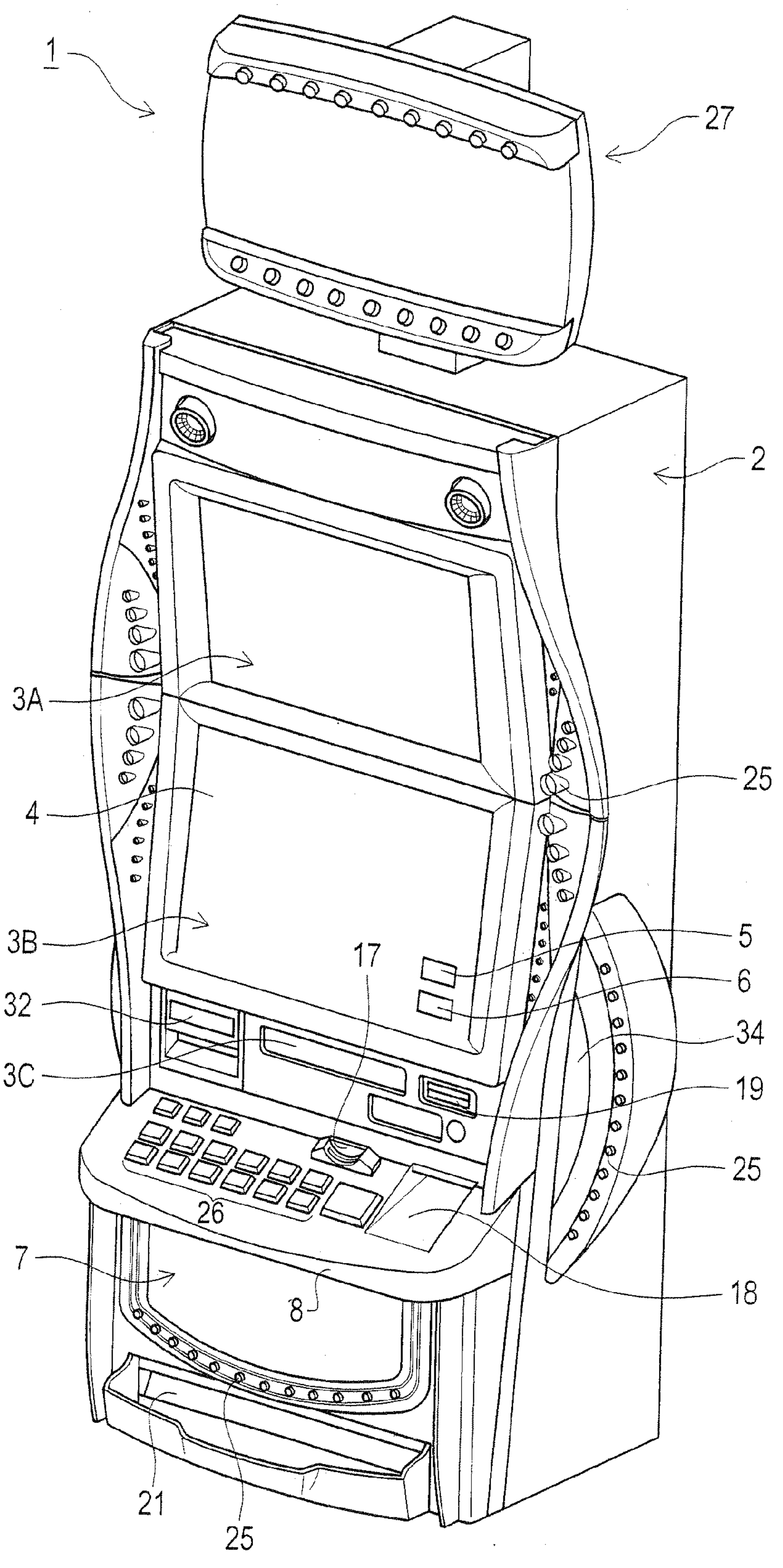
FIG. 2 is a perspective view showing an outer appearance of a slot machine.

Next, the schematic configuration of the slot machine 1 according to the present embodiment will now be described in detail while referring to the accompanying drawings. FIG. 2 is a perspective view showing an outer appearance of the slot machine 1 according to the present embodiment.

The slot machine 1 according to the present embodiment is an upright-type slot machine which is installed in a gaming arcade such as a casino or the like. The outer aspect of the slot machine 1 as shown in FIG. 2 represents simply one example of the present invention. However, this outer aspect is not limited to this instance alone.

As shown in FIG. 2, the slot machine 1 has a cabinet 2. The cabinet 2 serves as housing portion for housing electrical or mechanical components. These electrical or mechanical components are used in execution of a predetermined game aspect.

The slot machine 1 has an upper display portion 3A, a variable display portion 3B and a lower display portion 3C provided at a front face of cabinet 2. The upper display portion 3A, the variable display portion 3B and the lower display portion 3C display various types of game information.

The upper display portion 3A is constituted of a liquid crystal panel and is arranged at an upper level of the cabinet 2. The upper display portion 3A displays effect images, payout tables and game rules for the game, etc.

Figure 3:
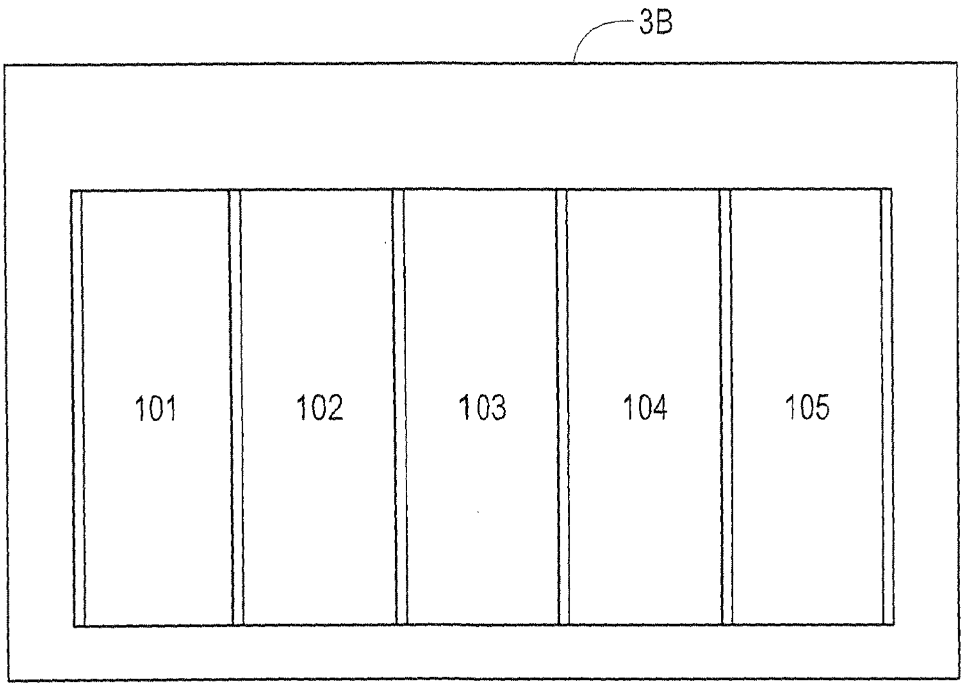
FIG. 3 is an explanatory diagram showing a reel display portion of the slot machine.
Figure 4:
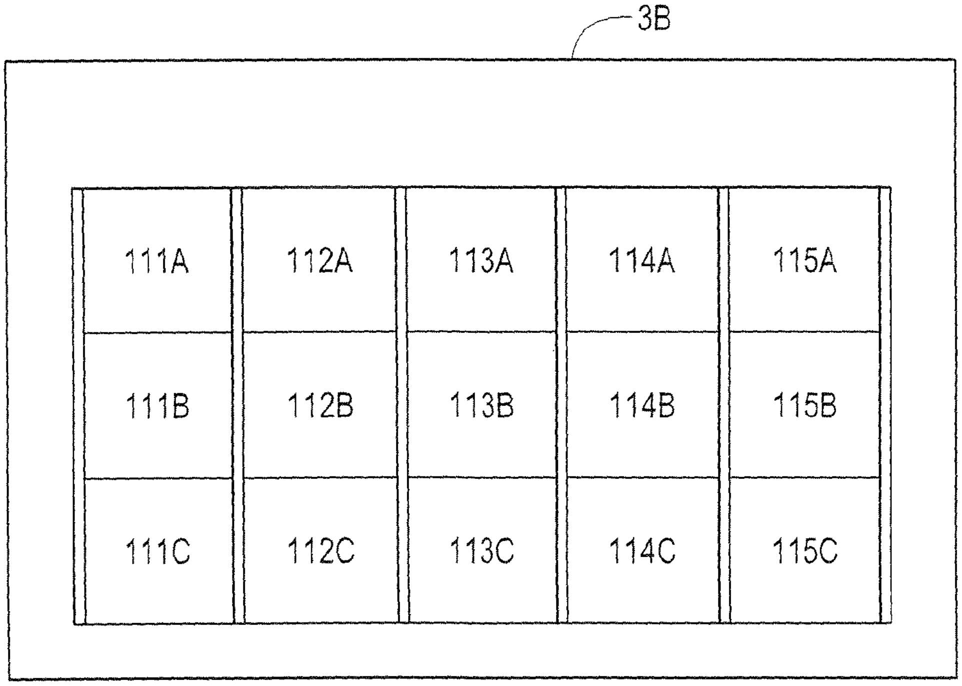
FIG. 4 is an explanatory diagram showing a symbol display area of the slot machine.

The variable display portion 3B is constituted of a liquid crystal panel which is arranged at a mid level of the cabinet 2. The variable display portion 3B has five reel display portions including a first reel display portion 101 through a fifth reel display portion 105 (refer to FIG. 3). The reel display portions serve to display symbol rows (specifically, a normal reel band 50, a first special reel band 50A and a second special reel band 50B) which are associated thereto in a variable fashion and stopped fashion. The first reel display portion 101 through the fifth reel display portion 105 each have three symbol display areas, respectively. More specifically, the first reel display portion 101 through the fifth reel display portion 105 each have symbol display areas 111A through 111C, 112A through 112C, 113A through 113C, 114A through 114C and 115A through 115C. Each symbol display area is adapted to display one symbol, respectively (refer to FIG. 4). In other words, the variable display portion 3D displays fifteen symbols in a 3×5 matrix. The number of reel display portions and the number of symbols displayed in one reel display portion may vary.

The variable display portion 3B has a touch panel 4 provided at a front face of its liquid crystal panel. The player can thus enter various types of commands by operating the touch panel 4. For instance, in a free game process (S18) as will be described later, the player selects a first choice image 91 and a second choice image 92 through the touch panel 4.

A payout amount display portion 5 and a credit amount display portion 6 are provided at a right lower portion of the variable display portion 3B. The display position to arrange the payout amount display portion 5 and the credit amount display portion 6 can be determined arbitrarily. A bet amount display portion for displaying the bet amount can also be provided in the variable display portion 3B. The payout amount display portion 5 displays a payout amount to be awarded to the player. The payout amount includes the payout amount which is granted if predetermined conditions are satisfied in the normal game, and an accumulated payout amount obtained in the free game. The credit amount display portion 6 displays the credit amount that the player currently possesses.

The lower display portion 3C is constituted of a liquid crystal panel. The lower display portion 3C is arranged at a lower level of the cabinet. The lower display portion 3C displays the number of points recorded in the card and the number of game points. In a case where the card is not inserted or when a card read failure occurs, a corresponding message is displayed on the lower display portion 3C.

A card reading portion 19 is provided at the periphery of the lower display portion 3C. The card reading portion 19 reads the information stored in the card that the player possesses.

As was described above, in the present embodiment, the upper display portion 3A, the variable display portion 3B and the lower display portion 3C are not limited to a liquid crystal display configuration. For instance, the respective display portions can be constituted using a CRT display, a plasma display, an LED display or other known display devices.

A lower panel 7 is provided at a lower side of the lower display portion 3C. This lower panel 7 is constituted of a plastic panel and is illuminated by a back light. The lower panel 7 includes a picture of a character relating to the slot machine 1, the designation of the slot machine and the like. The lower panel 7 can be constituted of a liquid crystal display, a CRT display, a plasma display, an LED display or other known display devices.

An operation table 8 is provided at a lower side of the variable display portion 3B. The operation table 8 has various types of operation buttons 26 (for instance, an exchange button, a cash out button, a help button, a BET button and a start button and the like). The operation table 8 has a coin insertion portion 17 and a bill insertion portion 18.

The position to arrange the respective types of operation buttons can be determined arbitrarily. As necessary, one portion of the respective operation buttons may be eliminated or buttons may be newly added or replaced.

A coin payout portion and a coin tray 21 are formed at a lower side of the cabinet 2. The coin payout portion serves to payout coins when the exchange button or the cash out button is operated. The coin tray 21 serves to receive coins that were paid out from the coin payout portion. The coin payout portion has a coin detecting portion provided therein. The coin detecting portion is constituted of a sensor or the like, and is adapted to detect the number of coins to be paid out from the coin payout portion.

A light emitting portion 25 is provided at the periphery of the cabinet 2 in the slot machine 1. This light emitting portion 25 illuminates in a predetermined illumination pattern in the event of a winning combination or during the free game. Further, a speaker 34 for audio output is provided at a side face of the cabinet 2. The position to arrange the light emitting portion 25 and the speaker 34 can be determined arbitrarily.

The slot machine 1 has a topper effect device 27 provided at the upper side of the cabinet 2 (refer to FIG. 2). The topper effect device 27 has a rectangular board shape and is arranged so as to be substantially parallel with the upper display portion 3A. The topper effect device 27 displays various types of information. The shape of the topper effect device 27 can be designed arbitrarily.

Figure 5:
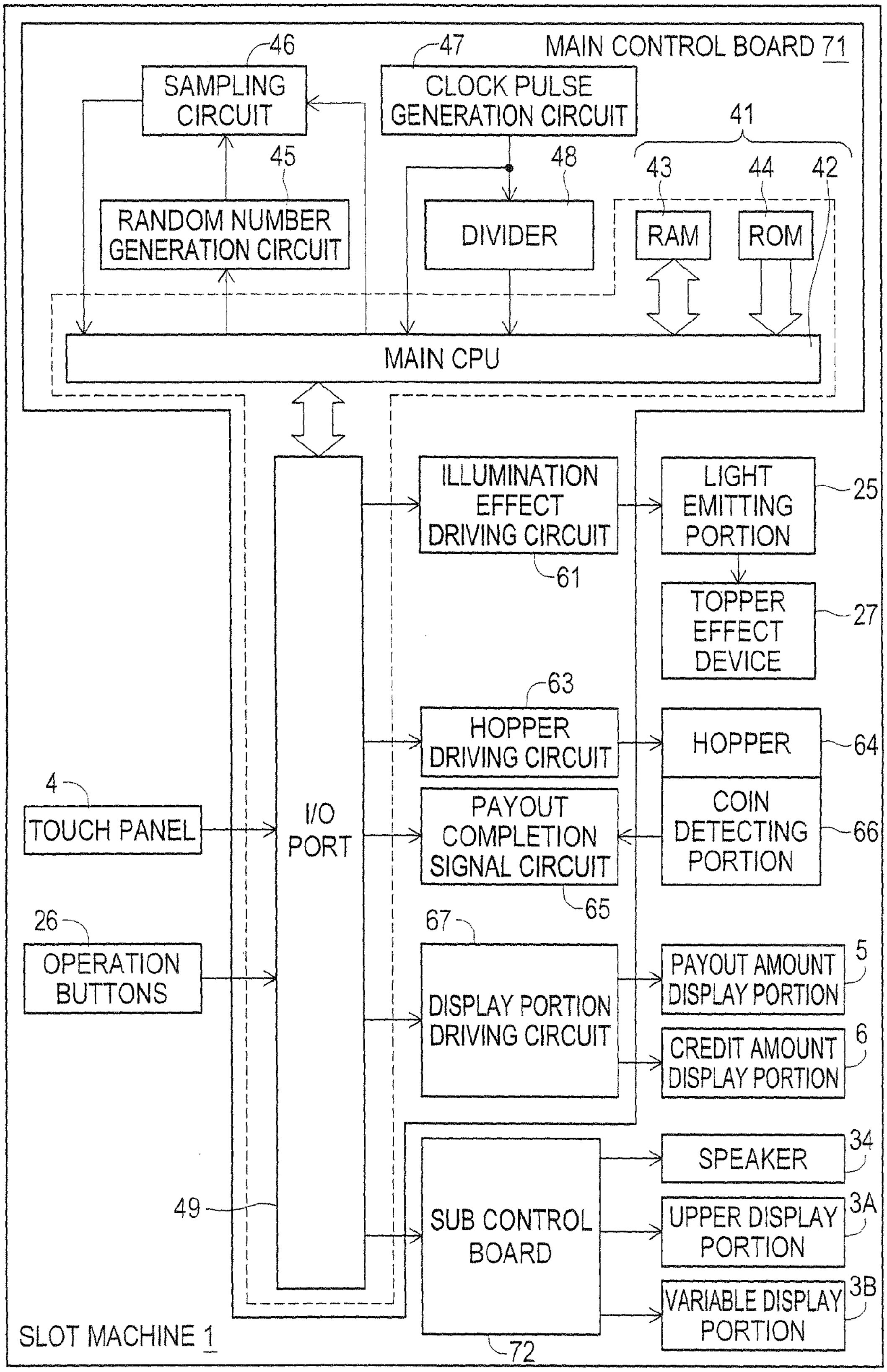
FIG. 5 is a block diagram showing an internal configuration of the slot machine.

Next, the internal configuration of the slot machine 1 will be described while referring to the drawings. FIG. 5 is a block diagram showing an internal configuration of the entire slot machine 1. As shown in FIG. 5, the slot machine 1 has a main control board 71 including a controller 41, with the main control board 71 serving as a functional core. The slot machine 1 further includes a plurality of constituting elements. The main control board 71 has a controller 41, a random number generation circuit 45, a sampling circuit 46, a clock pulse generation circuit 47, a divider 48, an illumination effect driving circuit 61, a hopper driving circuit 63, a payout completion signal circuit 65 and a display portion driving circuit 67.

The controller 41 has a main CPU 42, a RAM 43 and a ROM 44. The main CPU 42 operates in accordance with the programs stored in the ROM 44 and performs signal input and output with respect to the other constituting elements through the I/O port 49. Specifically, the main CPU 42 controls the operation of the entire slot machine 1.

The RAM 43 stores data and programs to be used when the main CPU 42 is operating. For instance, the RAM 43 temporarily retains, after the game starts, the random number values which have been sampled by the sampling circuit 46. The RAM 43 stores code numbers corresponding to the first reel display portion 101 through the fifth reel display portion 105. To be more specific, these code numbers respectively correspond to the normal reel band 50, the first special reel band 50A and the second special reel band 50B equipped for each of the first reel display portion 101 through the fifth reel display portion 105. Further, the RAM 43 stores payout data with respect to a progressive jackpot. Once the player places a bet, the RAM 43 adds one portion of this bet to the current payout data to update the data contents, and stores the result. The slot machine 1 according to the present embodiment has a plurality of progressive jackpots ("MAJOR JACKPOT", "MINOR JACKPOT") with differing initial values. The ROM 44 stores various types of control programs to be executed by the main CPU 42 and permanent data.

The programs stored in the ROM 44 include game programs and game system programs (hereinafter referred to as game programs or the like). Further, the game programs include lottery programs.

The lottery programs are executed upon determining the code numbers corresponding to symbols which are stopped at a central position in the respective reel display portions (specifically, symbol display areas 111B, 112B, 113B, 114B and 115B) of the variable display portion 3B.

This lottery program includes symbol weighing data. The symbol weighing data shows correspondence relationships between the respective code numbers and one or a plurality of random number values within a predetermined number value range. The probability of lottery with respect to each symbol on the reel band is set by associating one or a plurality of random number values to one code number. The random number values are drawn by lottery and symbols which are identified as final from the random number values are displayed in a predetermined area on the variable display portion 3B.

The random number generation circuit 45 operates in accordance with the commands from the main CPU 42 and generates random numbers within a fixed range. The sampling circuit 46 draws an arbitrary random number from the random numbers generated by the random number generation circuit 45 in response to a command from the main CPU 42. The sampling circuit 46 inputs the random number thus drawn to the main CPU 42. The clock pulse generation circuit 47 generates a reference clock for causing the main CPU 42 to operate. A divider 48 inputs a signal obtained by dividing the reference clock by a constant cycle to the main CPU 42.

The main control board 71 is connected to the touch panel 4. As was described above, the touch panel 4 is arranged at a front face of the variable display portion 3B and is adapted to identify a coordinate position of the portion that was touched by the player. Specifically, the touch panel 4 can determine the operation of the player (for instance, the portion that the player has touched, and in what direction the touched portion has moved) based on the coordinate position information thus identified. A signal in accordance with the determination result is then inputted to the main CPU 42 through the I/O port 49.

The main control board 71 is connected to the operation buttons 26 (the above-described start button, etc.) which serve to enter commands to execute a game, through the operation switch. Accordingly, a signal in accordance with a depression operation of the operation buttons 26 is inputted to the main CPU 42 through the I/O port 49.

The illumination effect driving circuit 61 outputs an effect signal in accordance with a command from the main CPU 42 and is used to control illumination effects performed by the light emitting portion 25 and the topper effect device 27. The topper effect device 27 is connected to the illumination effect driving circuit 61 through the light emitting portion 25.

The hopper driving circuit 63 drives the hopper 64 under the control of the main CPU 42. As a result, the hopper 64 carries out a predetermined operation to payout coins to the coin payout portion. The coin detecting portion 24 detects the number of coins that were paid out by the hopper 64 and then inputs coin amount value data showing the amount of coins that was detected to the payout completion signal circuit 65. The payout completion signal circuit 65 receives coin amount value data from the coin detecting portion 24. Then, when the received coin amount data has reached the set coin amount value, the payout completion signal circuit 65 inputs a signal that notifies completion of coin payout to the main CPU 42. The display portion driving circuit 67 controls the display operation of the respective display portions including the payout amount display portion 5 and the credit amount display portion 6 and the like.

Figure 6:
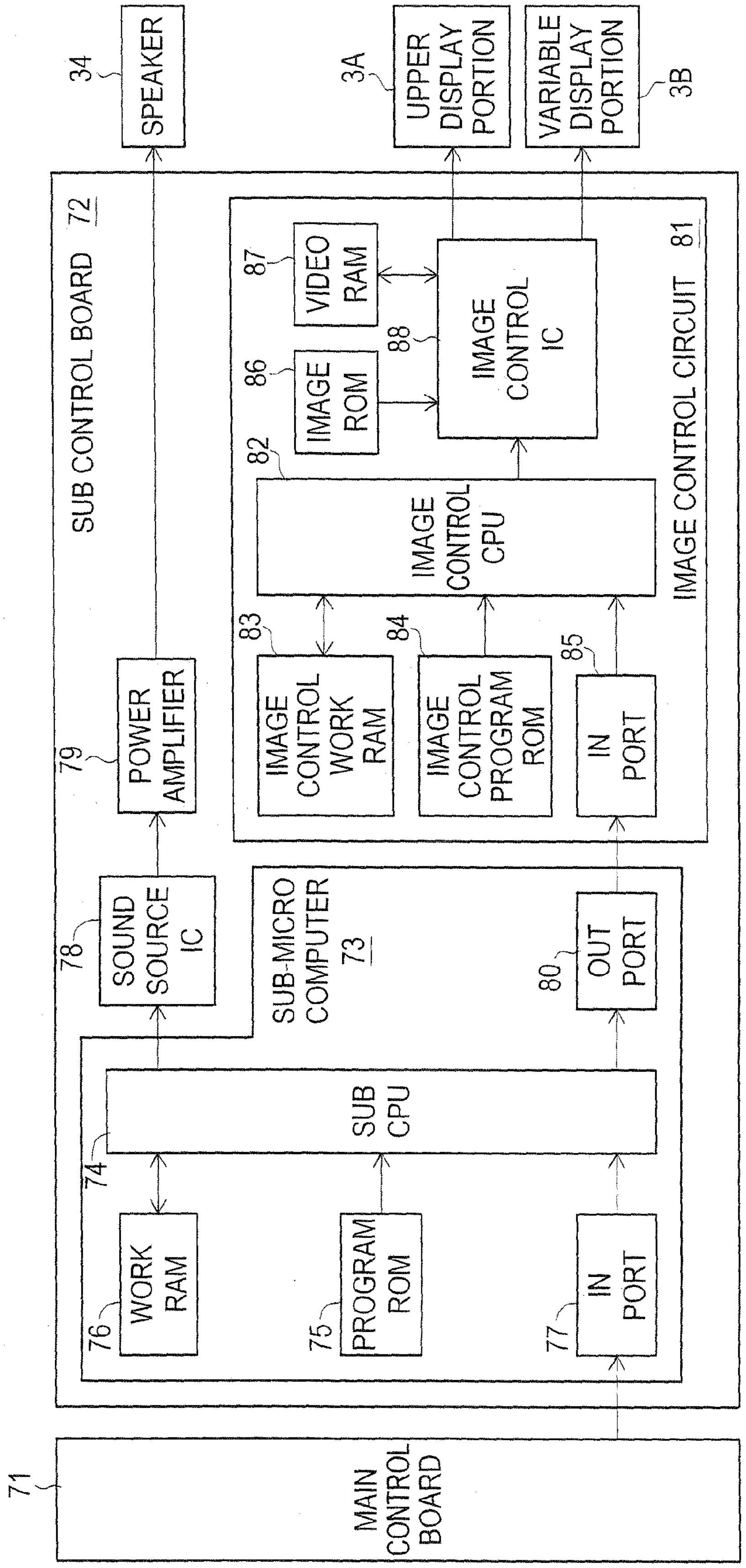
FIG. 6 is a block diagram showing an internal configuration of a sub-control board in the slot machine.

The main control board 71 is connected to the sub-control board 72. As shown in FIG. 6, the sub-control board 72 carries out display control of the respective display portions and output control of the audio outputted by the speaker 34 based on the commands inputted from the main control board 71. This sub-control board 72 is constituted on a separate circuit board from the circuit board that constitutes the main control board 71. The sub-control board 72 has a micro computer (hereinafter referred to as "sub-micro computer 73") which is provided as a main constituting element. Then, the sub-control board 72 has a sound source IC 78, a power amplifier 79 and an image control circuit 81. The sound source IC 78 controls the audio which is outputted from the speaker 34. The power amplifier 79 functions as an amplifier with respect to the audio outputted from the speaker 34. The image control circuit 81 operates as a display control section for the upper display portion 3A and the variable display portion 3B.

The sub-micro computer 73 has a sub-CPU 74, a program ROM 75, a work RAM 76 and I/O ports 77 and 80. The sub-CPU 74 carries out a control operation in accordance with a control instruction transmitted from the main control board 71. The program ROM 75 stores a control program executed by the sub-CPU 74. The work RAM 76 is constituted as a temporary memory to be used in executing the control program in the sub CPU 74.

The sub-control board 72 does not have a clock pulse generation circuit, a divider, a random number generator and a sampling circuit, and executes random number sampling based on an operation program of the sub CPU 74.

The image control circuit 81 has an image control CPU 82, an image control work RAM 83, an image control program ROM 84, an image ROM 86, a video RAM 87 and an image control IC 88. The image control CPU 82 determines the image to be displayed on the upper display portion 3A and the variable display portion 3B based on the parameters set in the sub-micro computer 73 and the image control programs to be described later. For instance, the image control CPU 82 displays a payout table and a help screen on the upper display portion 3A. The image control CPU 82 serves to display symbols in a variable fashion and stopped fashion on the respective symbol display areas 111A through 111C, 112A through 112C, 113A through 113C, 114A through 114C and 115A through 115C in the variable display portion 3B.

The image control program ROM 84 stores an image control program and various types of selection tables relating to display on the upper display portion 3A and the variable display portion 3B. The image control work RAM 83 functions as a temporary memory to be used in execution of the image control program in the image control CPU 82.

The image control IC 88 forms an image in accordance with the contents determined by the image control CPU 82 and then outputs the image thus formed to the upper display portion 3A and the variable display portion 3B. The image ROM 86 stores dot data for forming an image. The video RAM 87 functions as a temporary storage device to be used when an image is formed in the image control IC 88.

The internal configuration of the above-described slot machine 1 represents simply one example thereof and is not limited to the above-described configuration. For instance, the memory card and the PLD (Programmable Logic Device) can be constituted so as to be detachable. The memory card and the PLD can be constituted so as to allow readout of necessary information therefrom.

The slot machine 1 according to the present invention employs coins, bills or electronic valuable information (credits) corresponding to coins or bills, as gaming values. The gaming values applicable to this invention are not limited to these types. Medals, tokens, electronic money, tickets and the like, for instance can also be used as gaming values.

Figure 7:
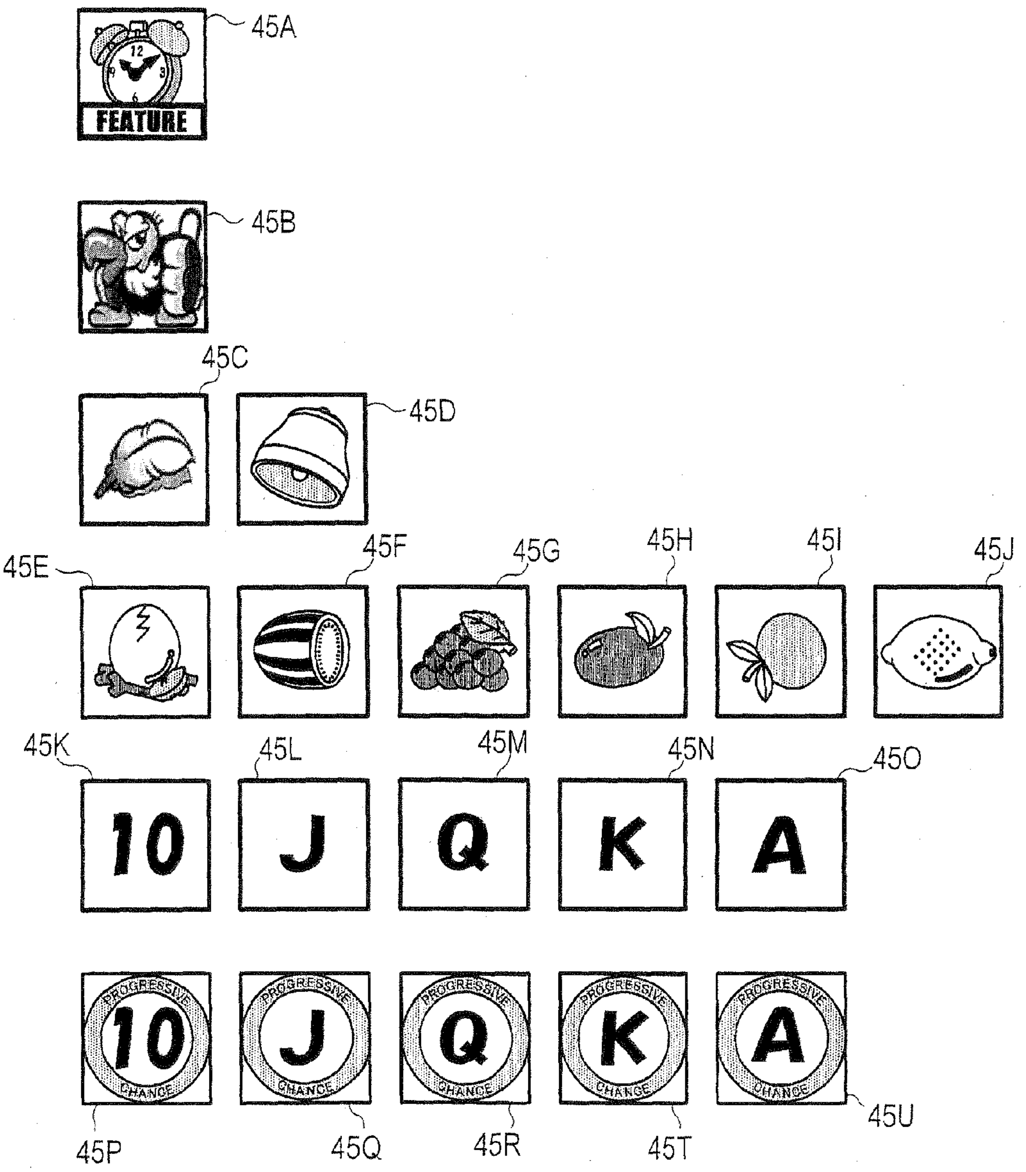
FIG. 7 is an explanatory diagram showing respective symbols constituting a reel band in the slot machine.
Figure 8:
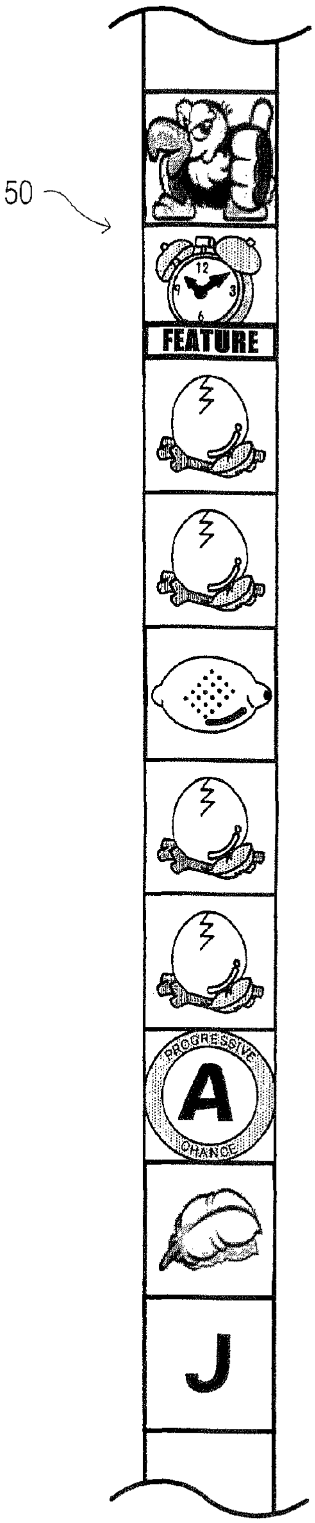
FIG. 8 is an explanatory diagram showing one portion of a normal reel band in the slot machine.

Next, the symbols which are drawn on the reel band and are variably displayed on the reel display portion will now be described in detail while referring to the accompanying drawings. FIG. 7 is a view showing one example of symbols drawn on the reel bands which are variably displayed on the respective reel display portions. FIG. 8 shows one portion of a normal reel band 50 which is variably displayed on each reel display portion.

As shown in FIG. 7, the normal reel band 50 according to the present embodiment includes 20 types of symbols. A feature symbol 45A (FEATURE) serves as a free game trigger for shifting to a free game, as a feature game, as was described earlier. A condor symbol 45 (CONDOR) is associated to the highest payout in the slot machine 1 (refer to FIG. 11).

A feather symbol 45C (FEATHER) and a bell symbol 45D (BELL) are associated to the second highest payout following the condor symbol 45B (refer to FIG. 11).

An egg symbol 45E (EGG), a watermelon symbol 45F (WATERMELON), a grape symbol 45G (GRAPE), a plum symbol 45H (PLUM), an orange symbol 45I (ORANGE) and a lemon symbol 45J (LEMON) are associated to lower payouts than the condor symbol 45B, the feather symbol 45C and the bell symbol 45D. These six types of symbols differ from the above-described three types of high payout symbols. Specifically, a payout is awarded only in the event four to ten identical symbols from these six types of symbols are displayed in a stopped state (refer to FIG. 11).

"10" symbol 45K (10), jack symbol 45L (J), queen symbol 45M (Q), king symbol 45N (K), ace symbol 45O (A) are associated to an even smaller payout as compared to the above-described six types of symbols. Specifically, a payout is awarded only in the event four or five identical symbols from these five types of symbols are displayed in a stopped state (refer to FIG. 11).

A bonus "10" symbol 45P (BONUS-10), bonus jack symbol 45Q (BONUS-J), bonus queen symbol 45R (BONUS-Q), bonus king symbol 45T (BONUS-K) and bonus ace symbol 45U (BONUS-A) are handled as identical symbols with the above-described "10" symbol 45K through ACE symbol 45O.

The above-described bonus "10" symbol 45P through bonus ace symbol 45U function as bonus game triggers for shifting to the bonus game as will be described later.

If three or more of the five types of symbols are displayed on the variable display portion 3B in a stopped fashion (in case of the above-described five types of symbols, the type is irrelevant), the bonus game trigger is turned ON.

As shown in FIG. 8, the respective types of symbols as shown in FIG. 7 are drawn in a predetermined sequence in normal reel band 50. The normal reel band 50 as shown in FIG. 8 represents simply one example of a reel band. The sequence in which the symbols are drawn may also be determined arbitrarily. The number of symbols drawn on one normal reel 50 is determined arbitrarily, and kinds of to-be-drawn symbols may also be defined arbitrarily.

In the present embodiment, different normal reel bands 50 are associated to the first reel display portion 101 through the fifth reel display portion 105. Also, the same normal reel band 50 can be associated to the respective reel display portions.

Next, a game which is carried out in the slot machine 1 according to the present embodiment will now be described. In the game which is carried out in the slot machine 1, all the symbols are scatter symbols. Specifically, in the game according to the present embodiment, a prize is awarded based on the number of identical symbols displayed on the symbol display areas 111A through 111C, 112A through 112C, 113A through 113C, 114A through 114C and 115A through 115C arranged in a 3×5 matrix in the variable display portion 3B (refer to FIG. 11).

As was described earlier, the bonus "10"] symbol 45P through the BONUS ace symbol 45U are handled as "10" symbol 45K through ACE symbol 45O, respectively.

Figure 9:
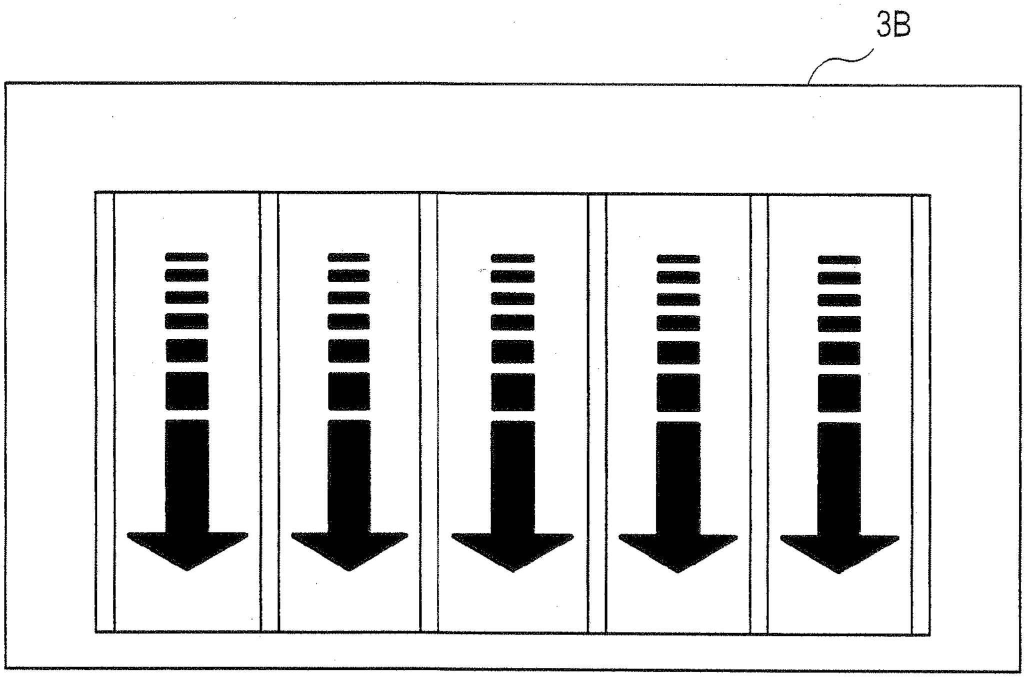
FIG. 9 is an explanatory diagram showing a variable display portion wherein symbols are displayed in a variable fashion.

To start a game in the slot machine 1, the player operates the BET button to set the bet amount and then depresses the start button. As a result, the normal reel band 50 of each reel display portion starts spinning. In other words, the symbol row drawn on the normal reel band 5 is displayed in a scrolling fashion in a downward direction in each of the first reel display portion 101 through the fifth reel display portion 105 (refer to FIG. 9).

Figure 10:
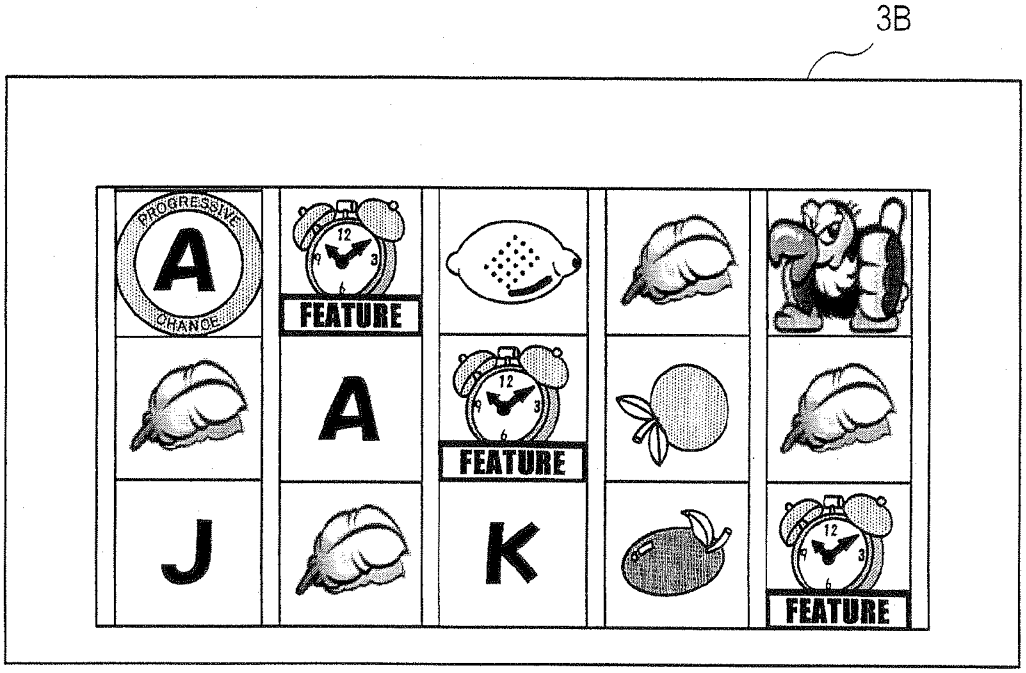
FIG. 10 is an explanatory diagram showing a variable display portion wherein symbols are displayed in a stopped fashion.

After a predetermined period has passed, the normal reel band 50 in each of the first reel display portion 101 through the fifth reel display portion 105 is displayed in a stopped fashion. Consequently, one portion of the symbol row constituting each normal reel band 50 (specifically, three symbols constituting the respective normal reel band 50) is displayed in a stopped fashion on each reel display portion. In other words, as shown in FIG. 10, one symbol is stopped and displayed respectively in each of the three symbol display areas constituting each reel display portion. As a result, the variable display portion 3B displays fifteen symbols in a stopped fashion (refer to FIG. 10).

As was described above, in the game according to the present embodiment, a winning combination is determined based on the number of identical symbols displayed on the variable display portion 3D and a prize corresponding to the winning combination is awarded. In the event of a winning combination, an amount obtained by multiplying the payout amount in accordance with the winning combination by the bet amount will be awarded to the player (refer to FIG. 11). This will be further described in more detail.

Next, the contents of the winning combination and the prize in the slot machine 1 according to the present embodiment will be described while referring to the drawings. FIG. 11 is an explanatory diagram showing a payout table according to the present embodiment.

As shown in FIG. 11, the payout table contains associations between the winning combination and prize to be awarded (specifically, the payout amount). The payout amount in the payout table shown in FIG. 11 shows the payout amount in the case the bet amount is "1". Thus, if the bet amount is "1", a payout amount as shown in FIG. 11 will be paid out. Also, if the bet amount is "2" or more, an amount obtained by multiplying the bet amount by the payout amounts as shown in FIG. 11 will be paid out.

For instance, if nine feather symbols 45C are displayed in the fifteen symbol display areas (e.g., symbol display areas 111A through 111C, 112A through 112C, 113A through 113C, 114A through 114C, 115A through 115C) in the variable display portion 3B, "an amount obtained by multiplying the bet amount by 500 credits" will be paid out to the player (refer to FIG. 11).

If four watermelon symbols 45F are displayed on the fifteen symbol display areas in the variable display portion 3D, "an amount obtained by multiplying the bet amount by 8 credits" will be paid out to the player (refer to FIG. 11). A payout amount is set for each winning combination in a similar manner, as shown in FIG. 11.

In the present embodiment, if three or more feature symbols 45A are displayed in the fifteen symbol display areas in the variable display portion 3B, a feature game is awarded to the player, in place of a payout amount. In the present embodiment, a so-called free game is awarded as feature game. Here, the free game can be executed without the need for the player to bet new credits.

In the present embodiment, if three or more bonus "10" symbol 45P through bonus ace symbol 45U are displayed in a stopped state, irrespective of their type, on the fifteen symbol display areas constituting the variable display portion 3B, a high payout such as a progressive jackpot is awarded to the player. The contents of the high payout to be awarded are determined in a bonus game process (S20).

If the symbols displayed in the fifteen symbol display areas of the variable display portion 3B do not correspond to any of the winning combinations shown in FIG. 11, the player loses. In case of losing, the player is not awarded a payout or prize.

Figure 12:
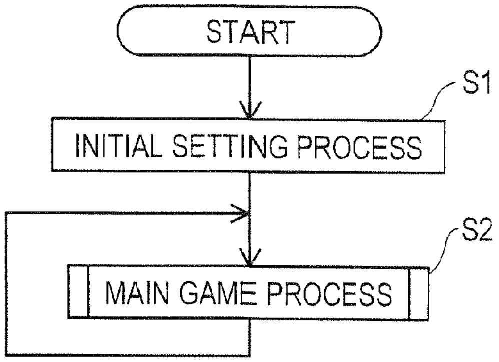
FIG. 12 is a flow chart of a main control process program according to the present embodiment.

Next, the main control program which is executed in the slot machine 1 according to the present embodiment will be described in detail while referring to the accompanying drawings. FIG. 12 is a flow chart of a main control program.

When the power switch is turned on (upon power on), the main control board 71 and the sub-control board 72 are activated and the controller 41 executes an initial setting process (S1). In the initial setting process (S1), the main CPU 42 executes the BIOS stored in the ROM 44 and expands the compressed data incorporated in the BIOS in the RAM 43. In executing the BIOS that was expanded in the RAM 43, the main CPU 42 carries out a diagnosis and initialization of the different types of peripheral devices. Further, the main CPU 42 writes the game programs and the like from the ROM 44 into the RAM 43 to acquire payout rate setting data and country identification information. While executing the initial setting process (S1), the main CPU 42 also carries out an authentication process with respect to each program.

When the initial setting process (S1) ends, the main CPU 42 executes a main game process (S2). In this main game process (S2), the main CPU 42 sequentially reads the game programs and the like from the RAM 43 and executes these programs. The slot machine 1 according to the present embodiment carries out the game by executing this main game process (S2).

The main game process (S2) is repeatedly executed while power is being supplied to the slot machine 1.

Figure 13:
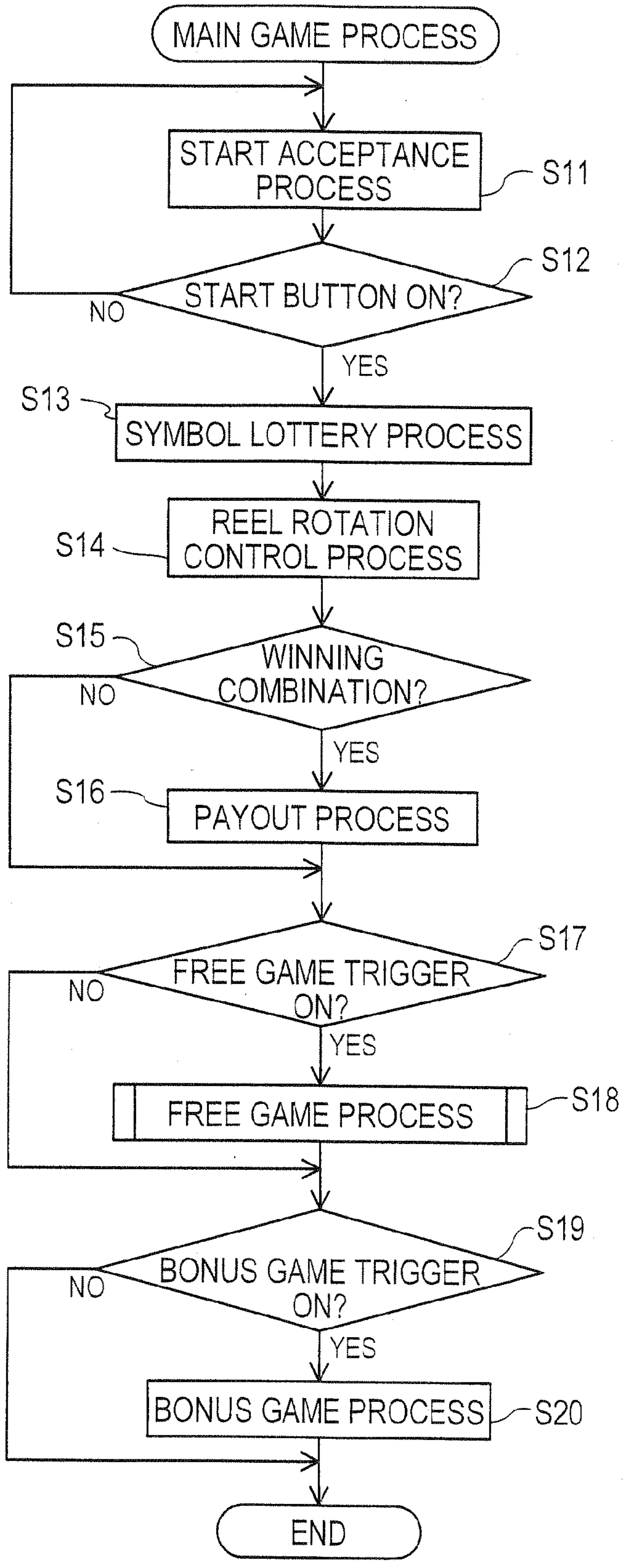
FIG. 13 is a flow chart of a main game process program according to the present embodiment.

Next, the main game process program which is executed in the main game process (S2) will now be described while referring to the drawings. FIG. 13 is a flow chart of a main game process program to be executed in the slot machine 1 according to the present embodiment. The programs shown in the following flow chart are stored in the ROM 44 and RAM 43 provided in the slot machine 1 and are executed in the main CPU 42.

As shown in FIG. 13, the main CPU 42 first executes a start acceptance process (S11). In the start acceptance process (S11), the player inserts coins and carries out a betting operation using the BET button from amongst the operation buttons 26.

After shifting to step S12, the main CPU 42 determines whether the start button from amongst the operation buttons 26 has been depressed or not. The main CPU 42 determines the presence or absence of a depression with respect to the start button based on the presence or absence of a signal in response to a depression of the start button. If the start button has been depressed (S12: YES), the main CPU 42 subtracts the above bet amount set based on the betting operation from the credit amount that the player currently possesses. Then, the main CPU 42 stores the bet amount in the RAM 43 as bet information. At this time, the main CPU 42 adds one portion of the gaming values (credit) that were bet to the payout data with respect to the progressive jackpot which was stored in the RAM 43. Then, the main CPU 42 changes the contents of the payout data in the RAM 43.

Changing of the payout data with respect to the progressive jackpot is carried out with respect to each of a plurality of progressive jackpots ("MAJOR JACKPOT", "MINOR JACKPOT").

After subtraction of the credit amount and storing of the bet information have ended, the main CPU 42 shifts the flow to step S13. On the other hand, if the start button has not been depressed (S12: NO), the main CPU 42 returns the flow to the start acceptance process (S11). As a result, the player can carry out an operation to correct the bet amount, etc.

After shifting to step S13, the main CPU 42 executes a symbol lottery process. In this symbol lottery process (S13), the main CPU 42 executes the lottery program stored in the RAM 43, thereby sampling a random number value from a number value range within a predetermined random number value range. The main CPU 42 determines the symbols that are stopped at the central portion in each reel display portion (specifically, symbol display areas 111B, 112B, 113B, 114B and 115B) based on the sampled random number value and table.

Here, a process using the random number value extracted in the symbol lottery process (S13) will now be described based on the drawings. FIG. 14 shows one example of a table including associations between the symbols drawn on any one reel band and the code numbers. FIG. 15 shows one example of a table including associations between the random number values and the code numbers.

These tables containing associations between the symbols and the code numbers (for instance, refer to FIG. 14) exist in association with each of the first reel display portion 101 through the fifth reel display portion 105.

As was described above, in the symbol lottery process (S13), the main CPU 42 executes a lottery program, thereby sampling a random number value from a predetermined random number range (for instance, 0 through 65535). Thereafter, the main CPU 42 determines the code numbers based on the sampled random number value and a table including associations between the random number values and the code numbers (refer to FIG. 15, for instance). After the code numbers have been determined, the main CPU 42 determines the symbols to be stopped in the central part of the reel display portion based on the code numbers and the table including associations between the symbols and code numbers (refer to FIG. 14).

For instance, when the normal reel band 50 shown in FIG. 14 is used with respect to the first reel display portion 101, if the random number value "1136" is sampled, the main CPU 42 determines the code number "08" based on the random number value "1136" and the table shown in FIG. 15. Then, the main CPU 42 determines the egg symbol 45E as the symbol which will be stopped and displayed on the symbol display area 111B based on the code number "08" and the table shown in FIG. 14.

The process using the random number value in the symbol lottery process (S13) is not limited to the instance of using the random number value, the table including associations between the random number values and the code numbers (refer to FIG. 15, for instance) and the table including associations between the symbols and the code numbers (refer to FIG. 14).

For instance, the sampled random number values and the symbols may be directly associated. Alternatively, the sampled random number values and the winning combinations can be directly associated to thereby allow determination of the symbol to be stopped using the table.

The processes in executing the main game process program following the symbol lottery process (S13) will next be described while referring back to FIG. 12.

After the symbol lottery process (S13) ends, the main CPU 42 executes a reel rotation control process (S14). In this reel rotation control process (S14), the main CPU 42 displays the normal reel band 50 on the first reel display portion 101 through the fifth reel display portion 105 in a variable fashion at a predetermined speed. Then, the main CPU 42 determines the effect pattern (pattern for image display on the variable display portion 3B and audio output from the speaker 34) with respect to a unit game. The main CPU 42 starts the effects based on the effect pattern thus determined by controlling the sub-control board 72, etc. Here, the unit game refers to a game executed in a sequence of processes from the start of variable display of each reel band until all the reel bands are stopped.

After the lapse of a predetermined period, the main CPU 42 stops the normal reel band 50 on the first reel display portion 101 through the fifth reel display portion 105 in a predetermined sequence. Thus, one symbol is stopped and displayed on each of the fifteen symbol display areas (specifically, symbol display areas 111A through 111C, 112A through 112C, 113A through 113C, 114A through 114C and 115A through 115C) in the variable display portion 3B.

After the reel rotation control process (S14), the main CPU 42 judges whether or not the symbols displayed on the variable display portion 3B in a stopped fashion correspond to a winning combination (S15). More specifically, the main CPU 42 judges whether or not the symbols correspond to a winning combination based on the code numbers of each reel display portion stored in the RAM 43. If a winning combination is established (S15: YES), the main CPU 42 calculates a payout amount corresponding to the winning combination, based on the payout table (refer to FIG. 11). The main CPU 42 then shifts the flow to process S16. Alternatively, if no winning combination is established (S15: NO), the main CPU 42 shifts the process to S17.

After shifting to S16, the main CPU 42 executes a payout process. In this payout process (S16), the main CPU 42 pays out to the player a payout amount in accordance with the winning combination determined at S15. After the payout process (S16) ends, the main CPU 42 shifts the flow to process S17.

At the following process S17, the main CPU 42 judges whether the free game trigger has been established. More specifically, the main CPU 42 references the code numbers for the reel display portions that were stored in the RAM 43. Then, the CPU 42 judges whether or not "three or more feature symbols 45A are displayed in a stopped fashion on the fifteen symbol display areas constituting the variable display portion 3B".

If three or more feature symbols 45A are displayed in a stopped fashion and the free game trigger is turned ON (S17 YES), the main CPU 42 shifts the flow to the free game process (S18). Alternatively, if the free game trigger has not been established (S17: NO), the main CPU 42 shifts the flow to process S19, as is.

After shifting to S18, the main CPU 42 executes a free game process. In the free game process (S18), the main CPU 42 executes a predetermined number of free games using the special reel band (the first special reel band 50A or the second special reel band 50B) selected by the player. The free game process (S18) will be described in detail later while referring to the drawings. Accordingly, description thereof at this point is omitted. After the end of the free game process (S18), the main CPU shifts the flow to process S19.

At S19, the main CPU 42 judges whether or not a bonus game trigger has been established. More specifically, the main CPU 42 references the code numbers for the reel display portions, which code numbers were stored in the RAM 43. Then, the main CPU 42 judges whether or not "3 or more bonus "10" symbol 45P through bonus ace symbol 45U are displayed in a stopped fashion on the fifteen symbol display areas constituting the variable display portion 3B". If the bonus game trigger is turned ON (S19: YES), the main CPU 42 shifts the flow to the bonus game process (S20). Alternatively, if the bonus game trigger is not established (S19: NO), the main CPU 42 ends the main game process program, as is. As was described above, as soon as the main game process program ends, the program is re-executed.

After shifting to step S20, the main CPU 42 executes a bonus game process. In the bonus game process (S20), the main CPU 42 determines the bonus contents (for instance, the type of the progressive jackpot to be awarded) based on the results of the bonus game. Then, the main CPU 42 awards a bonus with the contents thus determined.

More specifically, the main CPU 42 accepts selection by the player of one pay line, from a plurality of types of pay lines (not shown). Then, the main CPU 42 displays the symbols in a variable fashion and stopped fashion on the variable display portion 3B. Then, the main CPU 42 determines the contents of the bonus in the form of award of a "MAJOR JACKPOT" or award of a "MINOR JACKPOT" in accordance with the symbols which are displayed in a stopped fashion on the selected pay line. Then, a bonus is awarded in accordance with the contents thus determined. Once the bonus game process (S20) has ended, the main CPU 42 ends the main game process program as is. In this case as well, as soon as the main game process program ends, the program is re-executed.

The free game process program to be executed at S18 of the main game process program will now be described in detail while referring to the drawings. FIG. 1 is a flow chart showing a free game process program according to the present embodiment.

The procedure of the free game is in principle the same as that of the normal game. The differences between the two procedures are the fact that in the free game, gaming values (credits) corresponding to the bet amount are not consumed when the game starts, and that the game is carried out successively in an automatic manner, without requiring a player's operation of the operation buttons.

Once the free game trigger is established (S17: YES) and the flow shifts to the free game process, the main CPU 42 first executes a reel change process (S21). In this reel change process (S21), the main CPU 42 accepts the player's selection of the first choice image 91 and the second choice image 92. Then, the main CPU 42 changes the normal reel band 50 in the reel display portions by setting the band to a special reel band (first special reel band 50A or second special reel band 50B) in accordance with the selection results. This reel change process (S21) will be described in more detail later while referring to the drawings. Accordingly, description thereof at this point will be omitted. Once the reel change process (S21) ends, the main CPU 42 shifts the flow to process S22.

Here, the first special reel band 50A and the second special reel band 50B will be described in detail while referring to the drawings.

The first special reel band 50A is a special reel band generated based on the normal reel band 50. The first special reel band 50A is generated by substituting the condor symbol 45B having the highest payout associated thereto for predetermined egg symbols 45E included in the normal reel band 50.

For instance, the portion of the normal reel band 50 shown in FIG. 8 includes four egg symbols 45E and one condor symbol 45B. In case of generating a first special reel band 50A based on the normal reel band 50, two egg symbols 45E are equivalent to the above mentioned predetermined egg symbol. These two egg symbols 45E belong to four egg symbols 45E included in the normal reel band 50. Accordingly, the condor symbol 45B is substituted for the two egg symbols. Specifically, the portion of the first special reel band 50A thus generated corresponding to the normal reel band 50 shown in FIG. 8 includes three condor symbols 45B and two egg symbols 45E (refer to FIG. 16(A)). The main CPU 42 generates the first special reel band 50A by executing this process with respect to all normal reel bands 50. Accordingly, the first special reel band 50A includes a larger number of condor symbols 45B as compared to the normal reel band 50.

As is the case with the first special reel band 50A, the second special reel band 50B is a special reel band generated based on the normal reel band 50. The second special reel band 50B is generated by substituting the condor symbol 45B having the highest payout associated thereto, for the predetermined egg symbols 45E included in the normal reel band 50.

For instance, the portion of the normal reel band 50 as shown in FIG. 8 includes four egg symbols 45E and one condor symbol 45B. In case of generating a second special reel band 50B based on the normal reel band 50, three symbols 45E are equivalent to the above mentioned predetermined egg symbol. These three egg symbols 45E belong to the four egg symbols 45E included in the normal reel band 50. Accordingly, the condor symbol 45B is substituted for the three egg symbols 45E.

Figure 16A:
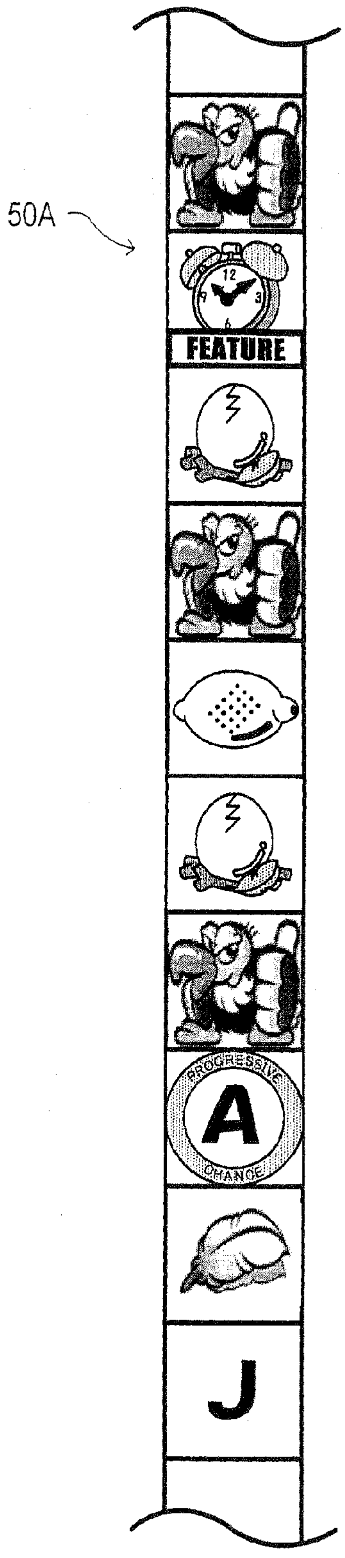
FIG. 16A is an explanatory diagram showing one portion of a first special reel band.
Figure 16B:
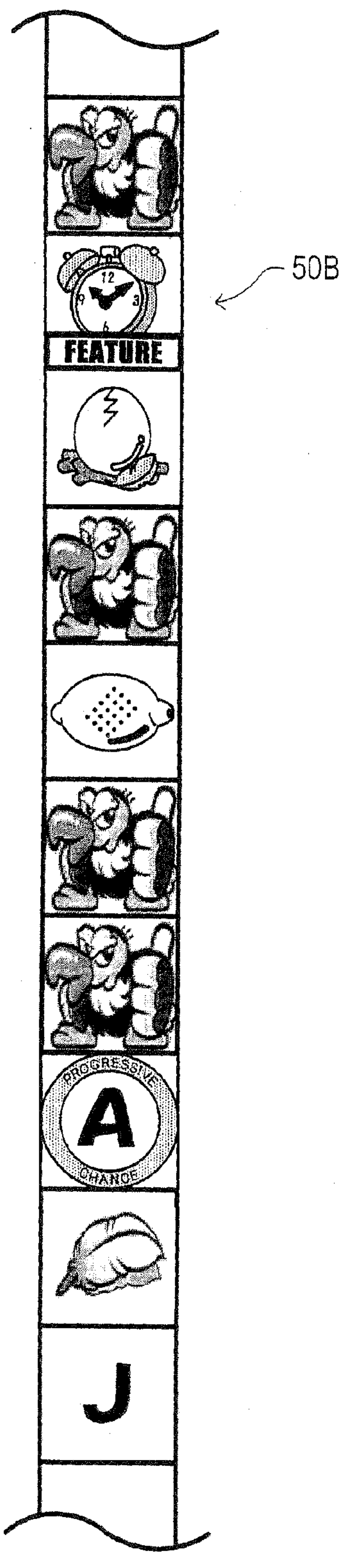
FIG. 16B is an explanatory diagram showing one portion of a second special reel band.

As can be understood from FIG. 8, FIG. 16(A) and FIG. 16(B), when generating the second special reel band 50B, the condor symbol 45B is further substituted for one egg symbol 45E, in addition to the two egg symbols 45E which are substituted when the first special reel band 50A is generated. Specifically, the portion of the second special reel band 50B thus generated corresponding to the normal reel band 50 shown in FIG. 8 includes four condor symbols 45B and one egg symbol 45E (refer to FIG. 16(B)).

The main CPU 42 generates the second special reel band 50B by executing this process with respect to the entire normal reel band 50. Accordingly, the second special reel band 50B includes a larger number of condor symbols 45B as compared to the normal reel band 50 and the first special reel band 50A (refer to FIG. 16(B)).

The processes following the reel selection process (S21) in the free game process program will now be described while referring back to FIG. 1. Once the reel selection process (S21) ends, the flow shifts to process S22, at which the main CPU 42 executes the symbol lottery process. In the symbol lottery process (S22), the main CPU 42 identifies the code numbers from the sampled random number values, in a similar fashion as the above-described symbol lottery process (S13). The main CPU 42 identifies the symbols to be displayed in a stopped fashion on the reel display portions using code numbers and the table including associations between code numbers and symbols.

In the symbol lottery process (S13), the table including associations between the code numbers and symbols for the normal reel band 50 will be used (refer to FIG. 14). However, in the symbol lottery process (S22), the main CPU 42 determines the symbols to be displayed in a stopped fashion on the reel display portions using the table (refer to FIG. 22(A)) for the first special reel band 50A set in the reel change process (S21), or the table (refer to FIG. 22(B)) for the second special reel band 50B. After the symbol lottery process (S22), the main CPU 42 shifts the flow to the reel rotation control process (S23).

The symbol lottery process (S22) uses a table which includes associations between the random numbers and the code numbers and is the same as the table used in the symbol lottery process (S13) (refer to FIG. 15).

After shifting to S23, the main CPU 42 executes the reel rotation control process. In the reel rotation control process (S23), the main CPU 42 displays symbols in a variable fashion and stopped fashion based on the first special reel band 50A or the second special reel band 50B associated to the respective reel display portions in the reel change process (S21) (refer to FIG. 16 and FIG. 22). Specifically, the reel rotation control process (S23) is similar in principle with the reel rotation control process (S14). Accordingly, a detailed description thereof is hereby omitted. Once the reel rotation control process (S23) ends, the main CPU 42 shifts the flow to process S24.

At S24, the main CPU 42 judges whether or not the symbols arranged on the variable display portion 3B correspond to a winning combination. More specifically, the main CPU 42 judges whether or not the symbols correspond to a winning combination based on the payout table (refer to FIG. 11) and the code numbers in the reel display portions as stored in the RAM 43. At this time, the main CPU 42 identifies the symbols which are displayed in a stopped fashion on the reel display portions using a table corresponding to the special reel band (specifically, the first special reel band 50A or the second special reel band 50B) which was associated to the reel display portions in the reel change process (S21) (refer to FIG. 22).

If the winning combination is established (S24: YES), the main CPU 42 shifts the flow to S25. Alternatively, if no winning combination is established (S24: NO), the main CPU 42 shifts the flow to process S26.

At S25, the main CPU 42 executes a payout addition process. In this payout addition process (S25), the main CPU 42 sequentially adds the payout amount determined at S24 to the payout amount obtained in the free game process. The payout amount obtained in the payout addition process (S25) is paid out to the player in the payout process (S19) as will be described later.

Then, at S26, the main CPU 42 judges whether or not the bonus game trigger has been established. The judgment process at S26 is in principle similar with the judgment process at S19 as was described earlier. If the bonus game trigger is ON (S26: YES), the main CPU 42 shifts the flow to process S27. Alternatively, if the bonus game trigger is not established (S26: NO), the main CPU 42 shifts the flow to process S28.

At S27, the main CPU 42 executes the bonus game process. This bonus game process (S27) is similar with the bonus game process (S20) in the main game process program as described above. As the contents of this process have already been described, further description of the bonus game process (S27) is hereby omitted. Once the bonus game process (S27) ends, the main CPU 42 shifts the flow to process S29.

After shifting to S28, the main CPU 42 judges whether or not the completion condition for the free game is satisfied. Specifically, the main CPU 42 judges whether or not a predetermined number of free games have been executed. If the predetermined number of games have been carried out (S28: YES), the main CPU 42 shifts the flow to the payout process (S29). Alternatively, if a number of games corresponding to the free game have not yet been executed (S28: NO), the main CPU 42 reverts the flow to the symbol lottery process (S22). As a result, one free game is re-executed in the slot machine 1.

At S29, the main CPU 42 pays out to the player the payout amount obtained in the payout addition process (S25). Once the payout process ends, the main CPU 42 ends the free game process program.

In the payout process (S29), the payout amount thus obtained is paid out in one time at the end of a predetermined number of free games. However, the payout amount can also be paid out in each free game.

Figure 17:
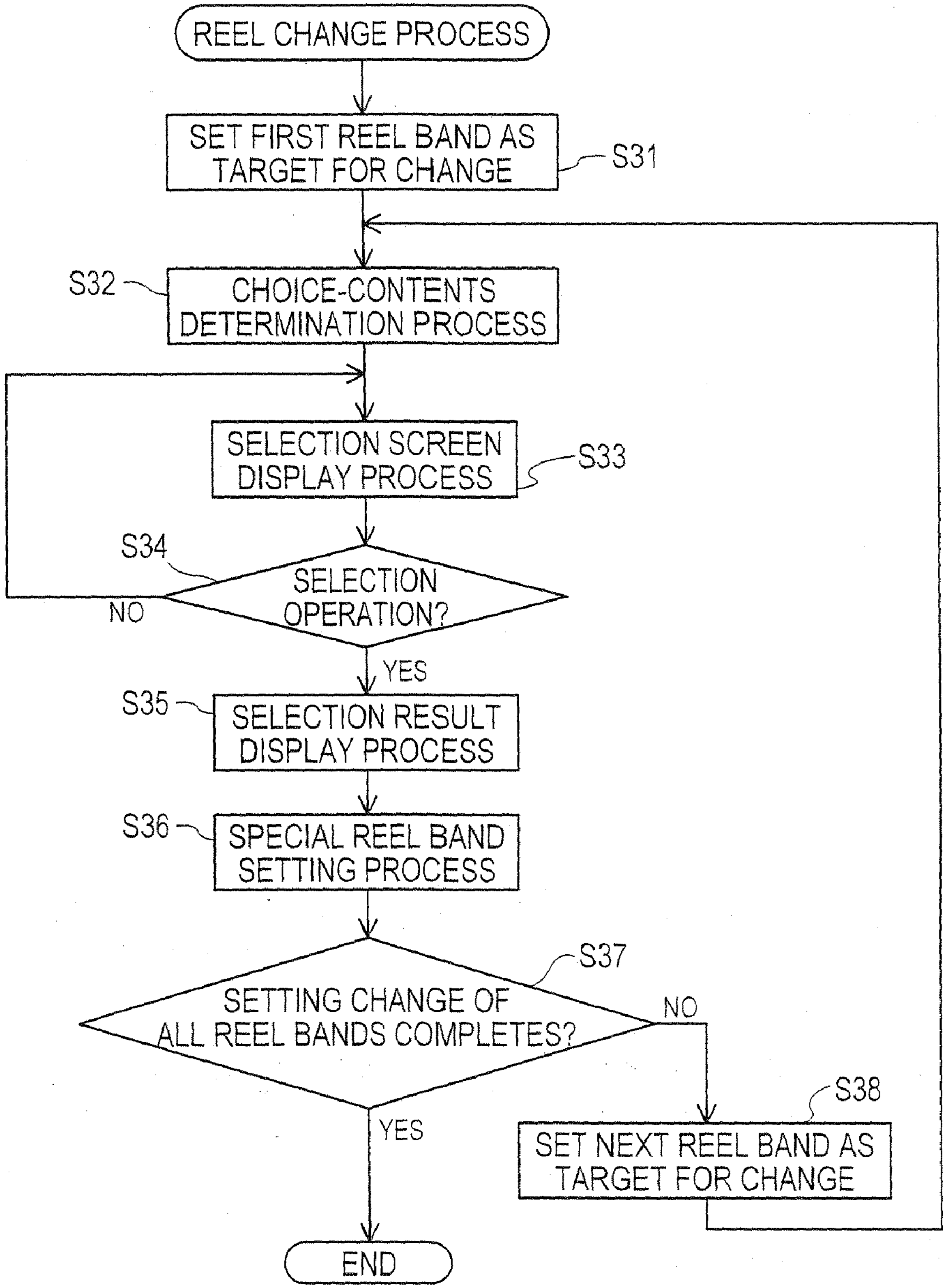
FIG. 17 is a flow chart of a reel change process program according to the present embodiment.

Next, a reel change process program to be executed at S21 in the free game process program will be described in detail while referring to the drawings. FIG. 17 is a flow chart of a reel change process program according to the present embodiment.

After shifting to the reel change process (S21) and execution of the reel change process program is started, the main CPU 42 first sets the normal reel band 50 associated to the first reel display portion 101 as a target for change (S31).

At the following process (S32), the main CPU 42 executes a choice-contents determination process. In this choice-contents determination process (S32), the main CPU 42 associates either of the first special reel band 50A and the second special reel band 50B to the first choice image 91 and the second choice image 92 displayed on the variable display portion 3B, by the lottery. Once the choice-contents determination process (S32) ends, the main CPU 42 shifts the flow to process S33.

More specifically, in the choice-contents determination process (S32), the main CPU 42 samples a random value from a predetermined random value range. Then, the main CPU 42 associates either of the first special reel band 50A and the second special reel band 50B to the first choice image 91 and the second choice image 92 based on the sampled random value and the choices determination table (refer to FIG. 18). For instance, if the random number value "509" is sampled, the main CPU 42 associates the second special reel band 50B to the first choice image 91. At this time, the main CPU 42 associates the first special reel band 50A to the second choice image 92.

After shifting to S33, the main CPU 42 executes a selection screen display process. In this selection screen display process (S33), the main CPU 42 displays the selection screen on the variable display portion 3B. After displaying the selection screen (refer to FIG. 19) on the variable display portion 3B, the main CPU 42 shifts the process to S34.

Figures 18, 19:
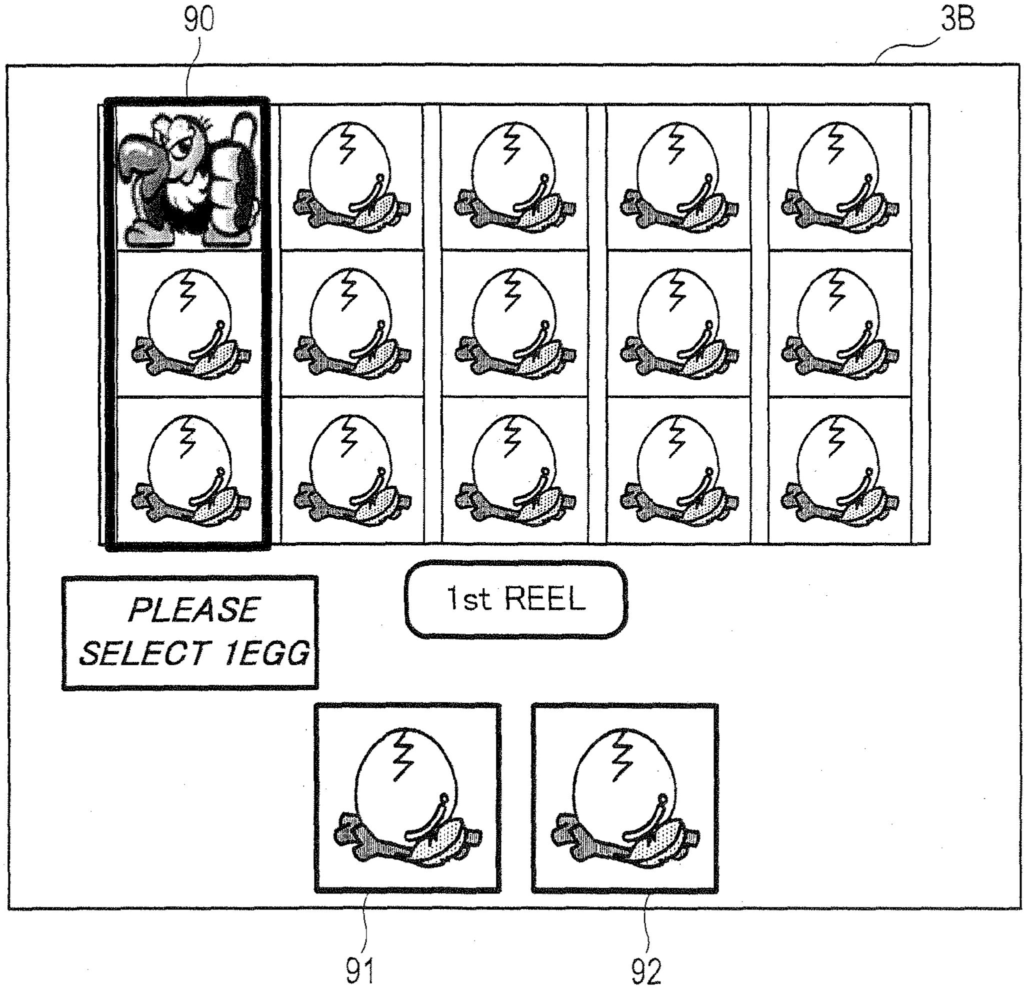
FIG. 18 is an explanatory diagram showing a choices determination table according to the present embodiment.
FIG. 19 is a display example of a selection screen displayed in the reel change process.

The selection screen displayed on the variable display portion 3B in the selection screen display process (S33) will now be described in detail while referring to the drawings. FIG. 19 is an explanatory diagram showing a display example of a selection screen according to the present embodiment.

As shown in FIG. 19, the change-target reel display portion 90, the first choice image 91 and the second choice image 92 are displayed in the variable display portion 3B in the selection screen displayed in the selection screen display process (S33). The change-target reel display portion 90 serves to display a reel display portion which is the current target for change. For instance, in the case shown in FIG. 19, the change-target reel display portion 90 shows that the current target for change is the first reel display portion 101.

The first choice image 91 shows one choice for the reel change process (S21). The first choice image 91 is associated to either of the first special reel band 50A and the second special reel band 50B in the choices determination process (S32). Alternatively, the second choice image 92 as well shows one choice for the reel change process (S21). The second choice image 92 is associated to either of the first special reel band 50A and the second special reel band 50B in the choices determination process (S32). As shown in FIG. 18, a special reel band which necessarily differs from the first choice image 91 is associated to the second choice image 92. Accordingly, at the time of making a selection with respect to the reel display portions, the player can surely select the first special reel band 50A and the second special reel band 50B.

Upon displaying the selection screen (refer to FIG. 19) on the variable display portion 3B, the main CPU 42 judges whether or not the player has carried out a selection operation with respect to the first choice image 91 and the second choice image 92 (S34). More specifically, the main CPU 42 carries out the determination at step S34 based on the presence or absence of an operation signal from an area corresponding to the first choice image 91 or the second choice image 92 in the touch panel 4. If the selection operation has been carried out (S34: YES), the main CPU 42 shifts the flow to process S35. Alternatively, if the selection operation has not yet been carried out (S34: NO), the main CPU 42 reverts the flow to S33.

After shifting to S35, the main CPU 42 executes a selection result display process. In this selection result display process (S35), the main CPU 42 displays a selection result screen showing the selection results (specifically, whether or not the first special reel band 50A is selected, and whether or not the second special reel band 50B is selected) in the selection made by the player on the variable display portion 3B. Specifically, the main CPU 42 notifies the selection results to the player.

A more concrete example of the selection result screen in the selection result display process (S35) will now be described in detail. In this example, the first reel display portion 101 is handled as the target for change. Also, in this example, in the choices determination process (S32), the second special reel band 50B is associated to the first choice image 91 and the first special reel band 50A is associated to the second choice image 92.

Figure 20:
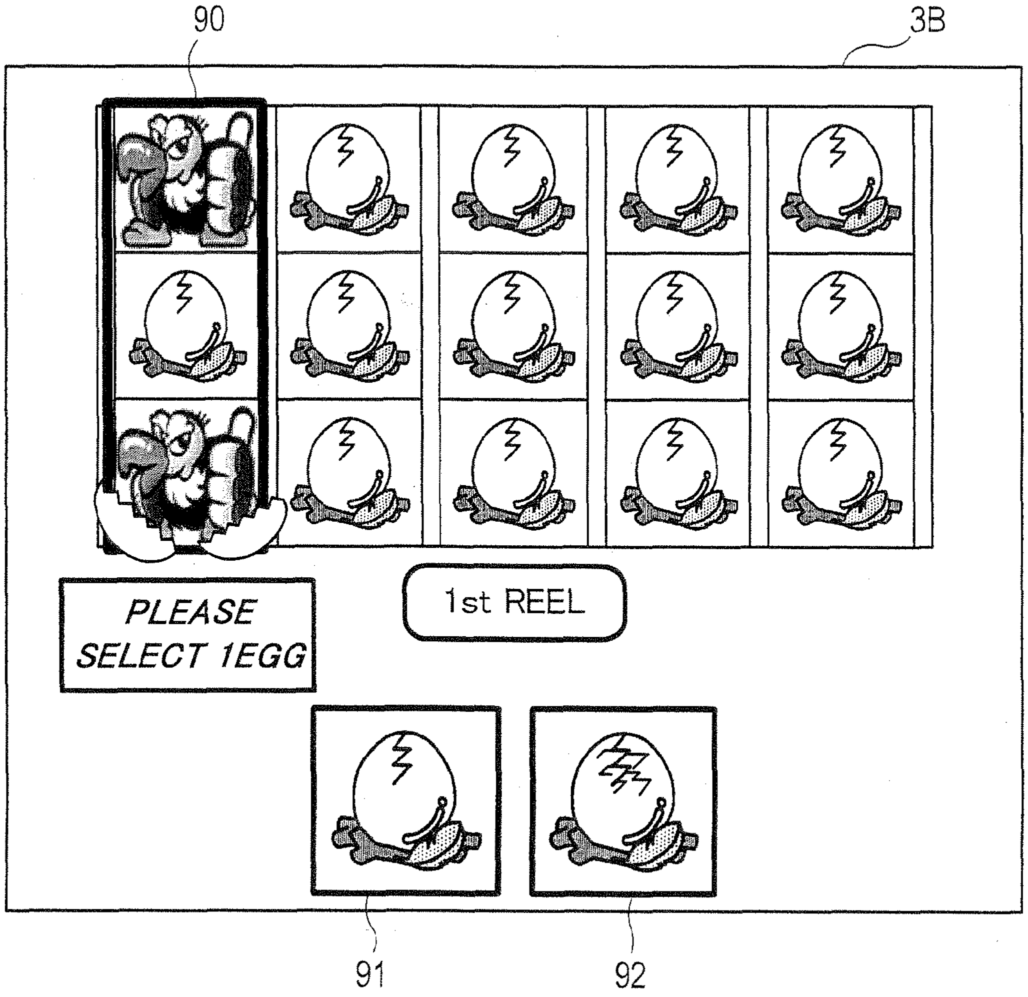
FIG. 20 is a display example of a selection result screen in the case that the selection result is a first special reel band.

First, a description will be given with respect to the selection result screen in the case that the result of the selection made by the player is “first special reel band 50A”. In this case, the main CPU 42 displays the selection result screen as shown in FIG. 20 on the variable display portion 3B. More specifically, in the selection result display process (S35), the main CPU 42 displays an animation image wherein the condor symbol 45B hatches from the egg symbol 45E displayed on the symbol display area corresponding to a lower portion of the reel display portion which is the target for change. In this case, in the selection result display process (S35), the main CPU 42 changes the choice image selected by the player (in this case, the second choice image 92 having a first special reel band 50A associated thereto) to an image showing an egg, in the choice image, having more cracks in it than before the selection operation.

Figure 21:
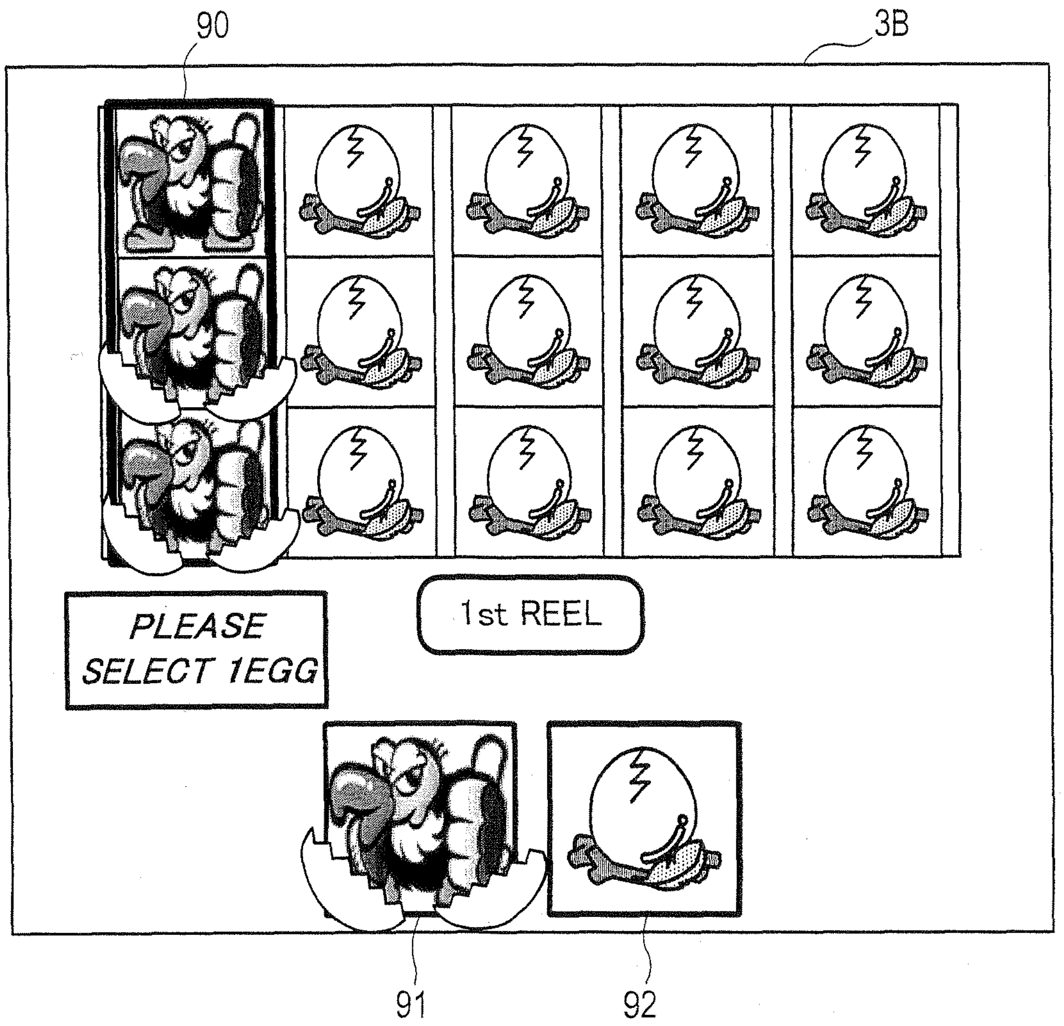
FIG. 21 is a display example of a selection result screen in the case that the selection result is a second special reel band.

Next, a description will be given with respect to the selection result screen in the case that the result of the selection made by the player is “second special reel band 50B”. In this case, the main CPU 42 displays the selection result screen as shown in FIG. 21 on the variable display portion 3B. More specifically, in the selection result display process (S35), the main CPU 42 displays an animation image wherein the condor symbols 45B hatch from two egg symbols 45E displayed on the symbol display area corresponding to a central portion and lower portion of the reel display portion which is the target for change. In this case, in the selection result display process (S35), the main CPU 42 changes the choice image selected by the player (in this case, the first choice image 91 having a second special reel band 50B associated thereto) to an image showing a condor symbol 45B which hatched from the egg shown in the choice image.

Specifically, as shown in FIG. 20 and FIG. 21, if the selection result is the second special reel band 50B, a larger number of animation images showing a condor symbol 45B which hatches from the egg symbol 45E are displayed as compared to the case that the selection result is a first special reel band 50A. As was described earlier, in the second special reel band 50B, the condor symbols 45B are substituted for a larger number of egg symbols 45E as compared to the first special reel band 50A. Specifically, the number of animation images in the target reel display portion corresponds to the number of condor symbols 45B included in the special reel band. Accordingly, the player can understand intuitively the selection results based on the number of animation images.

If the selection result is the second special reel band 50B, a choice image wherein a condor symbol 45B hatches from the egg is displayed. Alternatively, if the selection result is the first special reel band 50A, a choice image showing an egg with even more cracks in it is displayed. Here, the state that the egg included in the choice image has even more cracks in it shows that the condor symbol 45B failed to hatch. Accordingly, depending on the differences in the state of these choice images, the player can intuitively grasp that he/she failed to select the second special reel band 50B including a larger number of condor symbols 45B, but selected the first special reel band 50A.

Once the selection result display process (S35) ends, the main CPU 42 executes, at S36, a special reel band setting process. In the special reel band setting process (S36), the main CPU 42 sets either of the first special reel band 50A and the second special reel band 50B as the reel band for the target reel display portion, based on the selection results of the first choice image 91 or the second choice image 92.

More specifically, in this special reel band setting process (S36), the main CPU 42 generates a special reel band (specifically, the first special reel band 50A or the second special reel band 50B) in accordance with the selection result, based on the normal reel band 50 associated to the target reel display portion. Specifically, the main CPU 42 substitutes the condor symbol 45B for the identified egg symbol 45E (the identified egg symbols 45E differ depending on the selection result as described above) included in the normal reel band 50 displayed in the target reel display portion. As a result, the main CPU 42 can generate the special reel band based on the normal reel band 50, in accordance with the selection result and then sets this with respect to the reel display portion.

The slot machine 1 generates the first special reel band 50A and the second special reel band 50B based on the normal reel band 50. Accordingly, the slot machine 1 does not have to store the image data for a plurality of reel bands in the memory. As a result, the storage capacity in the memory can be saved in this slot machine 1.

In the special reel band setting process (S36), the main CPU 42 associates the table (refer to FIG. 22) including associations between the code numbers and symbols in the first special reel band 50A or the second special reel band 50B to the target reel display portion, based on the selection result. Accordingly, upon executing the free game process (S18) using the special reel band based on the selection result, the main CPU 42 can use the table including associations between the random numbers and the code numbers in the normal reel band 50. As a result, the table including associations between the random numbers and the code numbers in the special reel band does not have to be stored in the slot machine 1. Accordingly, the slot machine 1 can save the memory capacity corresponding to the data table.

In the special reel band setting process (S36), after setting the first special reel band 50A or the second special reel band 50B as the target reel display portion in accordance with the selection result, the main CPU 42 shifts the flow to process S37.

After shifting to S37, the main CPU 42 judges whether or not all the normal reel bands 50 of the first reel display portion 101 through the fifth reel display portion 105 are changed by setting them to the first special reel band 50A or the second special reel band 50B. If the normal reel bands 50 in all the reel display portions are changed by setting them to the special reel band (S37: YES), the main CPU 42 ends the reel change process program. The main CPU 42 shifts the flow to process S22 of the free game process program. Alternatively, if the setting and change operation with respect to all the reel display portions is not ended (S37: NO), the main CPU 42 sets the next reel display portion as the target for change (S38). Then, the main CPU 42 shifts the flow to process S32.

As was described earlier, the slot machine 1 according to the present embodiment executes a free game process (S21) as a feature game, when three or more feature symbols 45A are displayed on the variable display portion 3B in a stopped fashion, establishing a free game trigger. The slot machine 1 executes the reel change process (S21) prior to executing this free game.

In this reel change process (S21), the slot machine 1 displays a selection screen in the variable display portion 3B (refer to FIG. 19). The main CPU 42 accepts the selection operation made by the player with respect to the first choice image 91 or the second choice image 92. The first choice image 91 and the second choice image 92 are associated to the first special reel band 50A or the second special reel band 50B. Then, the slot machine 1 changes the normal reel band 50 used for displaying symbols in the reel display portions in a variable fashion and stopped fashion to the first special reel band 50A or the second special reel band 50B, in accordance with the selection made by the player. Then, the slot machine 1 executes a free game using the changed special reel band.

In the free game in the slot machine 1, display of the symbols on the reel display portions in a variable fashion and stopped fashion is carried out based on the first special reel band 50A or the second special reel band 50B selected by the player. As a result, the slot machine 1 can diversify the reel band used for displaying symbols in a variable fashion and stopped fashion in the free game. The slot machine 1 can thus offer novel amusement to the player with respect to the free game.

The slot machine 1 accepts selection of the first choice image 91 and the second choice image 92 made by the player prior to the start of the free game. The slot machine 1 changes the band to the special reel band based on the selection result. Accordingly, the slot machine 1 can offer amusement to the player such as involvement in the conditions of the free game (kind of the reel band to be used).

The slot machine 1 associates either the first special reel band 50A or the second special reel band 50B to the first choice image 91 and the second choice image 92, by lottery (S32). Specifically, the player cannot grasp the selection results in advance. As a result, the slot machine 1 can offer amusement to the player such as "surprise at the selection results of the first choice image 91 and the second choice image 92".

Further, the slot machine 1 generates the first special reel band 50A by substituting the condor symbol with a higher payout for the predetermined egg symbols 45E included in the normal reel band 50, based on the normal reel band 50 in the reel display portion. The slot machine 1 generates the second special reel band 50B by substituting the condor symbol with a higher payout for the predetermined egg symbols 45E included in the normal reel band 50, based on the normal reel band 50 in the reel display portion. Here, the egg symbol 45E which is substituted at the time the second special reel band 50B is generated includes the egg symbol 45E which is substituted at the time of generating the first special reel band 50A and the egg symbol 45E which is not substituted at the time of generating the first special reel band 50A.

Accordingly, the first special reel band 50A includes a larger number of condor symbols 45B than the normal reel band 50. The second special reel band 50B includes an even larger number of condor symbols 45B than the normal reel band 50 and a larger number of condor symbols 45B than the first special reel band 50A. As a result, in the free game which is carried out based on the first special reel band 50A or the second special reel band, the probability of obtaining a payout in accordance with the condor symbol 45B is dramatically improved as compared to the normal game based on the normal reel band 50. As a result, the slot machine 1 offers amusement to the player such as "a sense of expectancy with respect to award of a high payout in the free game".

Further, the second special reel band 50B includes a larger number of condor symbols 45B than the first special reel band 50A. Specifically, if the selection result is the second special reel band 50B, the player can play a free game in more favorable conditions as compared to the case that the selection result is a first special reel band 50A. As a result, the slot machine 1 can increase the importance of selecting the first choice image 91 and the second choice image 92, offering more amusement with respect to selecting these images.

The first special reel band 50A and the second special reel band 50B are generated by substituting predetermined symbols based on the normal reel band 50. Accordingly, data showing the first special reel band 50A and the second special reel band 50B themselves does not have to be stored in the memory (for instance, RAM 43, etc.). As a result, the slot machine 1 can save the memory capacity corresponding to the data in the first special reel band 50A and the second special reel band 50B, in the memory.

Further, in the reel change process (S21), the slot machine 1 executes the selection result display process (S35), once the player carries out selection with respect to the first choice image 91 and the second choice image 92. The slot machine 1 notifies to the player the selection results made by the player (the first special reel band 50A or the second special reel band 50B) (refer to FIG. 20 and FIG. 21). Accordingly, the player can grasp the kind of the special reel band used in the free game prior to start of the variable display of symbols in the free game. As a result, the slot machine 1 can raise the sense of expectancy of the player with respect to the free game.

The present invention is not limited to the present embodiment, but various improvements and modifications can be made thereto without departing from the scope of the present invention.

For instance, in the present embodiment, a description was given with respect to a so-called video slot machine. However, the slot machine can also include mechanical reels and a transparent liquid crystal display device having a variable display portion 3B arranged at a front face of the mechanical reels. Specifically, the slot machine 1 can be a so-called hybrid-type gaming machine. In this case, the pattern drawn on the mechanical reels is visible through the transparent liquid crystal display device.

In the hybrid-type slot machine, display of the symbols in a variable fashion and stopped fashion in the free game based on the first special reel band 50A and the second special reel band 50B can be obtained by displaying the symbols in a scrolled fashion and stopped fashion in conjunction with the rotation of the stoppage of the mechanical reels in the transparent liquid crystal display device.

In the present embodiment, to generate the first special reel band 50A and the second special reel band 50B from the normal reel band 50, the condor symbol 45B is substituted for the specific egg symbol 45E. However, this is not limited to this aspect alone. For instance, the symbol to be substituted can also include other symbols (for instance, the plum symbol 45H), in place of the egg symbol 45E. Also, the symbol to be substituted is not limited to one particular type, but can also include a plurality of types of symbols. Further, the substitute symbols are not limited to the condor symbol 45B, but may also include other symbols (for instance, the feather symbol 45C) or a plurality of types of symbols (for instance, the feather symbol 45C or the bell symbol 45D).

The present invention can also be realized as a gaming method for executing the above-described processes. Further, the present invention can be realized as a program for causing a computer to execute the gaming method, and a recording medium onto which the program is recorded.

What is claimed is:

1. A gaming machine having:

a display onto which symbols are displayed in a variable fashion and stopped fashion, based on a plurality of normal symbol rows each of which is composed of a plurality of types of symbols arranged therein; and a processor that executes processes as follows:

(a) a process of executing a normal game wherein symbols are displayed in a variable fashion and stopped fashion on the display, based on the plurality of normal symbol rows;

(b) a process of generating a first symbol row and a second symbol row by substituting a specific symbol for at least one of a first kind of symbol included in one of the plurality of the normal symbol rows wherein the first symbol row includes a larger number of the specific symbols than a normal symbol row and the second symbol row includes a larger number of the specific symbols than the first symbol row;

(c) a process of associating either of the first symbol row and the second symbol row, by lottery, to a plurality of choice images displayed on the display;

(d) a process of displaying the plurality of choice images on the display and accepting selection of the choice images directed to the first symbol row or the second symbol row, if a game result of the normal game satisfies a predetermined condition; and (e) a process of executing a special game wherein symbols are displayed on the display in a variable fashion and stopped fashion based on the first symbol row or the second symbol row associated to the selected choice images, and a prize is awarded based on the symbols which are displayed in a stopped fashion.

2. The gaming machine according to claim 1, wherein the processor further executes a process of notifying whether a symbol row which is associated to the selected choice images is the first symbol row or the second symbol row, if a selection with respect to the choice images has been made in each normal symbol row.

3. A gaming machine having:

a display onto which symbols are displayed in a variable fashion and stopped fashion, based on a plurality of normal symbol rows each of which is composed of a plurality of types of symbols including a special symbol to which a high payout amount is associated; and a processor that executes processes as follows:

(a) a process of executing a normal game wherein symbols are displayed on the display in a variable fashion and stopped fashion, based on the plurality of normal symbol rows;

(b) a process of generating a first symbol row and a second symbol row by substituting the special symbol for at least one of a first kind of symbol included in one of the plurality of the normal symbol rows, wherein the first symbol row includes a larger number of the special symbols than a normal symbol row and the second symbol row includes a larger number of the special symbols than the first symbol row;

(c) a process of associating either of the first symbol row and the second symbol row, by lottery, to a plurality of choice images displayed on the display;

(d) a process of displaying the plurality of choice images on the display and accepting selection of the choice images directed to the first symbol row or the second symbol row, if a game result of the normal game satisfies a predetermined condition; and (e) a process of executing a special game wherein symbols are displayed on the display in a variable fashion and stopped fashion based on the first symbol row or the second symbol row associated to the selected choice images, and a prize is awarded based on the symbols which are displayed in a stopped fashion.

4. The gaming machine according to claim 3, wherein the processor further executes a process of notifying whether or not a symbol row which is associated to the selected choice images is the first symbol row or the second symbol row, if a selection with respect to the choice images has been made in each normal symbol row.

5. A gaming machine having:

a display onto which symbols are displayed in a variable fashion and stopped fashion, based on a plurality of normal symbol rows each of which is composed of a plurality of types of symbols including a first symbol and a second symbol to which a high payout amount is associated; and a processor that executes processes as follows:

(a) a process of executing a normal game wherein symbols are displayed on the display in a variable fashion and stopped fashion, based on the plurality of normal symbol rows wherein a prize is awarded based on the symbols which are displayed in a stopped fashion;

(b) a process of generating a first symbol row by substituting the second symbol for at least one of the first symbol included in a normal symbol row, and generating a second symbol row by substituting the second symbol for at least one of the first symbol included in the normal symbol row so that the second symbol row includes a larger number of the second symbols than the first symbol row;

(c) a process of associating either of the first symbol row and the second symbol row, by lottery, to a plurality of choice images displayed on the display;

(d) a process of displaying the plurality of choice images on the display and accepting selection of the choice images directed to the first symbol row or the second symbol row for all of the plurality of normal symbol rows used for displaying symbols in a variable fashion and stopped fashion, if a game result of the normal game satisfies a predetermined condition; and (e) a process of executing a special game wherein symbols are displayed on the display in a variable fashion and stopped fashion based on the first symbol row or the second symbol row associated to the selected choice images, and a prize is awarded based on the symbols which are displayed in a stopped fashion.

6. The gaming machine according to claim 5, wherein the processor further executes a process of notifying whether or not a symbol row which is associated to the selected choice images is the first symbol row or the second symbol row, if a selection with respect to the choice images has been made in each normal symbol row.

* * * * *